(12) United States Patent
Chafekar

(10) Patent No.: US 11,428,573 B2
(45) Date of Patent: Aug. 30, 2022

(54) LIGHT EMITTING STRUCTURE, PHOTO-ACOUSTIC SPECTROSCOPY SENSING DEVICE, METHOD

(71) Applicant: Infineon Technologies AG, Neubiberg (DE)

(72) Inventor: Saumitra Sanjeev Chafekar, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 17/112,144

(22) Filed: Dec. 4, 2020

(65) Prior Publication Data
US 2021/0231496 A1    Jul. 29, 2021

(30) Foreign Application Priority Data
Jan. 28, 2020    (EP) .................................... 20154149

(51) Int. Cl.
*G01J 3/12*    (2006.01)
*G01J 3/02*    (2006.01)
(Continued)

(52) U.S. Cl.
CPC .......... *G01J 3/1256* (2013.01); *G01J 3/0208* (2013.01); *G01J 3/42* (2013.01); *B82Y 20/00* (2013.01)

(58) Field of Classification Search
CPC .................................................. G01J 3/1256
(Continued)

(56) References Cited

U.S. PATENT DOCUMENTS

| | | | |
|---|---|---|---|
| 7,819,539 B2 | 10/2010 | Kim et al. | |
| 2008/0011055 A1* | 1/2008 | Riddle | G01N 21/1702 73/24.02 |

(Continued)

FOREIGN PATENT DOCUMENTS

| | | | | |
|---|---|---|---|---|
| CN | 101599268 A | * | 12/2009 | |
| CN | 106936059 B | * | 10/2019 | ........... H01S 3/0947 |

(Continued)

OTHER PUBLICATIONS

Avramescu, Viorel et al., "Oxygen Sensor Based on Photo Acoustic Effect", IEEE International Semiconductor Conference (CAS), XP033251352, DOI: 10.1109/SMICND.2017.8101167, Oct. 11-14, 2017, pp. 97-100.

(Continued)

*Primary Examiner* — Tarifur R Chowdhury
*Assistant Examiner* — Omar H Nixon
(74) *Attorney, Agent, or Firm* — Slater Matsil, LLP

(57) ABSTRACT

A light emitting structure for a photo-acoustic spectroscopy sensing device for sensing a target gas comprises a light source configured for emitting light of an input wavelength. The light emitting structure further comprises a conversion structure that is configured for absorbing light of the input wavelength, and that is further configured for emitting light of an output wavelength. The output wavelength of the conversion structure is adapted to an absorption wavelength of the target gas. The conversion structure comprises an output conversion layer that comprises a plurality of nanoparticles. The nanoparticles of the output conversion layer are configured for emitting light of the output wavelength.

15 Claims, 22 Drawing Sheets

(51) Int. Cl.
*G01J 3/42* (2006.01)
*B82Y 20/00* (2011.01)

(58) Field of Classification Search
USPC .......................................................... 356/326
See application file for complete search history.

(56) References Cited

U.S. PATENT DOCUMENTS

| | | | |
|---|---|---|---|
| 2009/0272996 A1 | 11/2009 | Chakraborty | |
| 2012/0123256 A1* | 5/2012 | Razansky | G01N 21/1702 |
| | | | 600/431 |
| 2014/0078503 A1* | 3/2014 | Matsushita | G01J 3/0205 |
| | | | 356/416 |
| 2015/0150463 A1* | 6/2015 | Smeltzer | G01N 15/10 |
| | | | 600/431 |
| 2016/0356700 A1* | 12/2016 | Rouxel | G01N 29/2425 |
| 2017/0030532 A1* | 2/2017 | Ryohwa | H01L 33/501 |
| 2017/0292935 A1* | 10/2017 | Ren | G01N 29/022 |
| 2018/0038353 A1* | 2/2018 | Xiao | F24S 80/20 |
| 2019/0017966 A1* | 1/2019 | Csutak | E21B 49/081 |

FOREIGN PATENT DOCUMENTS

| | | | | |
|---|---|---|---|---|
| CN | 110492776 B | * | 6/2021 | ............... H02N 1/04 |
| GB | 2089041 A | | 6/1982 | |
| JP | 2005218684 A | * | 8/2005 | ........... A61B 5/0091 |
| JP | 2017154124 A | * | 9/2017 | |
| WO | WO-2008030219 A2 | * | 3/2008 | ......... G01N 21/1702 |
| WO | 2013153511 A | | 10/2013 | |

OTHER PUBLICATIONS

Scholz, Louisa et al., "Miniature Low-Cost Carbon Dioxide Sensor for Mobile Devices", IEEE Sensors Journal, vol. 17, No. 9, May 1, 2017, XP011645739, ISSN: 1530-437X, DOI: 10.1109/JSEN.2017.2682638, pp. 2889-2895.

* cited by examiner

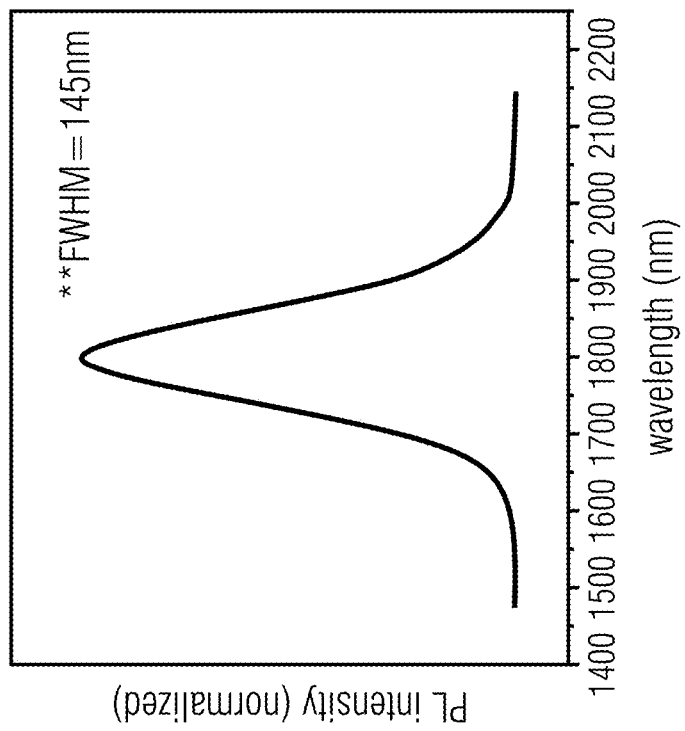
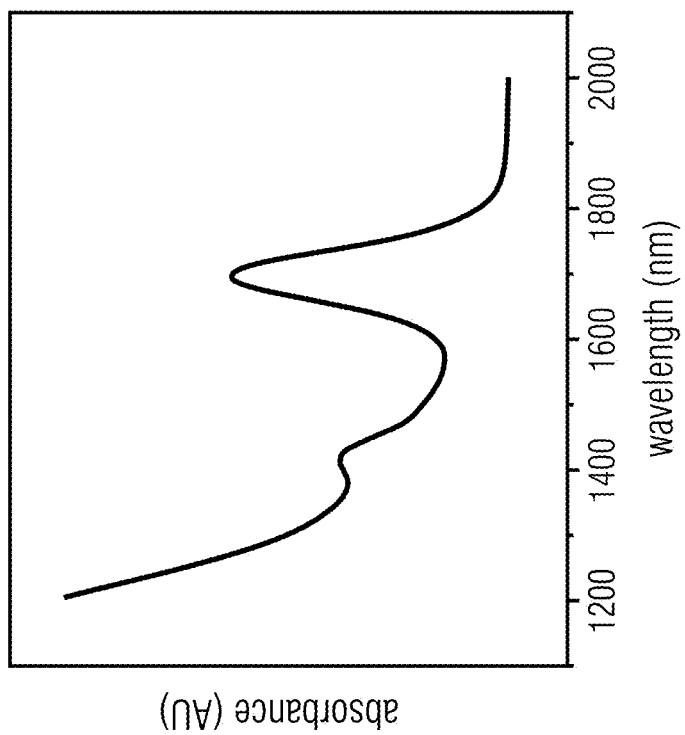
Fig. 8A
Fig. 8B

2000

2010 — Receiving 2010 an acoustic reference signal from a cavity 1213 accessible for an environmental gas comprising a target gas 2020 — Analyzing 2020 the acoustic reference signal to obtain a noise information 2030 — Adjusting 2030 a filter function based on the noise information 2040
- 2041 — Providing 2041 the cavity 1213 with a light 180, so that the light 180 is modulated based on the filter function
- 2042 — Receiving 2042 an acoustic sensing signal from the cavity 2050 — Analyzing 2050 the acoustic sensing signal by using the filter function so as to obtain an information about the target gas in the cavity 1213

Fig. 19

LIGHT EMITTING STRUCTURE, PHOTO-ACOUSTIC SPECTROSCOPY SENSING DEVICE, METHOD

This application claims the benefit of European Patent Application No. 20154149.7, filed on Jan. 28, 2020, which application is hereby incorporated herein by reference in its entirety.

TECHNICAL FIELD

The present application relates to a light emitting structure and to a photo-acoustic spectroscopy sensing device comprising the light emitting structure. Further embodiments relate to a method for operating a photo-acoustic spectroscopy sensing device and an apparatus for obtaining information about a target gas. In particular, embodiments of the present disclosure relate to photo-acoustic spectrometry for environmental sensing applications, particularly to a novel apparatus, system and method to sense/detect/measure multiple gasses and particulate matter in space constrained, mobile environmental sensing applications based on photo-acoustic spectrometry. Embodiments relate to a method for operating a photo-acoustic spectroscopy sensing device for efficient and accurate gas detection in acoustically noisy environments.

BACKGROUND

Photo-acoustic spectroscopy (PAS) is the measurement of the effect of absorbed electromagnetic energy, particularly of light, on matter by means of acoustic detection. It is a widely used method for measuring accurately the concentrations of various gasses due to its ability to evaluate subject sample in its in-situ state. A state of the art PAS working setup comprises a heater or a radiator emitting coherent radiation in the IR, the ultraviolet (UV), and the visible spectrum. An optical selection filter only allows radiation of interest (depending on the gas to be detected) and discards the rest of the radiation. The emitted radiation excites a mixture of gasses in a detection chamber. The excitation exerts pressure in an audible range that is to be detected by a detector, for example a microphone.

PAS is most popular for gasses that exhibit receptivity for infrared (IR) radiation due to following facts: Molecules can absorb and emit energy only at certain wavelengths. Further, the typical IR wavelengths of interest are considerably high to the size of the molecule of a gas to be detected. For example, infrared wavelength required for detection of carbon dioxide is 400 times greater than the size of a $CO_2$ molecule, where interaction between IR radiation and a gas molecule happens via an interaction of an electric field of the IR radiation with the molecule's electric charge distribution. Additionally, excited molecular states have very long lifetimes compared to an excited electron states—from milliseconds to tenths of seconds, this helps in easy and prominent detection. Further, the mean time between collisions with another molecule is roughly 0.1 µs—so, many collisions and efficient energy transfer further enhance the detectability. Finally, very little scattering occurs, leading to a higher robustness and viability for the detection solution. This also enhances the accuracy of the measurement.

Thus, the above described setup is typically targeting gasses that are well absorbent to IR radiation with molecules which exhibit easy excitation, for example, of bending and rotation and/or vibration modes. Such gasses are finite, as $N_2$ and $O_2$, which are significant gasses in environment, are transparent to IR radiation, leaving $CO_2$, $CH_4$, $H_2O$ and CO as most popular gasses for PAS based sensors, especially for environmental sensing and air quality monitoring systems.

However, the principle of PAS is also popular in detection of infrared insensitive environment pollutants. Such pollutants comprise other gasses that are sensitive to other specific wave lengths of the electromagnetic spectrum, and particulate matter that is most hazardous for human life. For infrared insensitive pollutants, setups similar to the one described before, with different wavelength selection filters, may be employed.

To detect multiple gasses, different certain wavelengths corresponding to the gas under detection are required to be emitted. For multi-gas detection using PAS, i.e. for detection of multiple gasses using one device/setup/geometry, an optical selection filter may be employed, which may be tuned to a specific absorption wavelength of a gas. Hence, the quality of gas detection in such setups may depend on transmissivity and selectivity of the optical selection filter. That is, for achieving good quality of multi-gas detection using PAS, a tunable optical filter with high transmissivity and selectivity may be required. State of the art examples of tunable optical filters rely on electrical, electromechanical, or a combination of both technologies. Examples are quartz based tunable filters, mechanical rotating wheel filters, micro-electromechanical systems (MEMS) based solutions, Fabry-Perot interferometer (FPI) based solutions, liquid crystal tunable filters, semiconductor/silicon grown IR heater with optical filters, and semiconductor/silicon grown light emitting diodes.

The aim of the present disclosure is to provide for a concept for an excitation of one or more target gasses with electromagnetic radiation, the concept enabling an accurate measurement of a concentration of the target gas via PAS while being compatible to space-constrained applications and cost-efficient manufacturing processes.

SUMMARY

Embodiments of the present disclosure provide a light emitting structure for a PAS sensing device for sensing a target gas. The light emitting structure comprises a light source configured for emitting light of an input wavelength. The light emitting structure further comprises a conversion structure that is configured for absorbing light of the input wavelength, and that is further configured for emitting light of an output wavelength. The output wavelength of the conversion structure is adapted to an absorption wavelength of the target gas. The conversion structure comprises an output conversion layer that comprises a plurality of nanoparticles. The nanoparticles of the output conversion layer are configured for emitting light of the output wavelength.

Further embodiments of the present disclosure provide for a PAS sensing device for sensing a target gas. The sensing device comprises a cavity providing an interaction volume for an optical interaction between the target gas and light, wherein the cavity is accessible for an environmental gas comprising the target gas. The sensing device comprises at least one light emitting structure. The at least one light emitting structure is configured for emitting the light into the cavity, the light having the output wavelength of the at least one light emitting structure, wherein the output wavelength is adapted to an absorption wavelength of the target gas. The sensing device further comprises a receiver configured for receiving an acoustic signal from within the cavity.

Further embodiments of the present disclosure provide a method for operating a PAS sensing device. The method comprises receiving an acoustic reference signal from a cavity accessible for an environmental gas comprising a target gas. The method further comprises analyzing the acoustic reference signal to obtain noise information. The method comprises adjusting a filter function based on the noise information. Further, the method comprises sensing the target gas, wherein the sensing comprises providing the cavity with a light, so that the light is modulated based on the filter function. Sensing the target gas comprises receiving an acoustic signal from the cavity simultaneously to providing the cavity with the light. The method further comprises analyzing the acoustic sensing signal by using the filter function so as to obtain information about the target gas in the cavity.

Further embodiments of the present disclosure provide an apparatus for obtaining an information about a target gas. The apparatus comprises means for receiving a reference signal, the reference signal representing an acoustic reference signal from a cavity accessible for an environmental gas comprising a target gas. The apparatus further comprises means for analyzing the reference signal to obtain noise information, and comprises means for adjusting a filter function based on the noise information. Further, the apparatus comprises means for providing the filter function, means for receiving a sensing signal representing an acoustic sensing signal from the cavity, and means for analyzing the sensing signal by using the filter function so as to obtain the information about the target gas in the cavity.

BRIEF DESCRIPTION OF THE DRAWINGS

Embodiments of the disclosure are described herein making reference to the appended drawings and figures.

FIG. 8A shows an exemplary absorption spectrum of nanoparticles of type E;

FIG. 8B shows an exemplary emission spectrum of nanoparticles of type E;

FIG. 19 shows a flow chart of a method for operating a PAS sensing device according to an embodiment;

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of light emitting structures and PAS sensing. The specific embodiments discussed are merely illustrative of specific ways to implement and use the present concept, and do not limit the scope of the embodiments. In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments. In the following description, a plurality of details is set forth to provide a more thorough explanation of embodiments of the disclosure. However, it will be apparent to one skilled it the art that other embodiments may be practiced without these specific details. In other instances, well-known structures and devices are shown in block diagram form rather than in detail in order to avoid obscuring examples described herein. In addition, features of the different embodiments described herein may be combined with each other, unless specifically noted otherwise.

Figure 1:
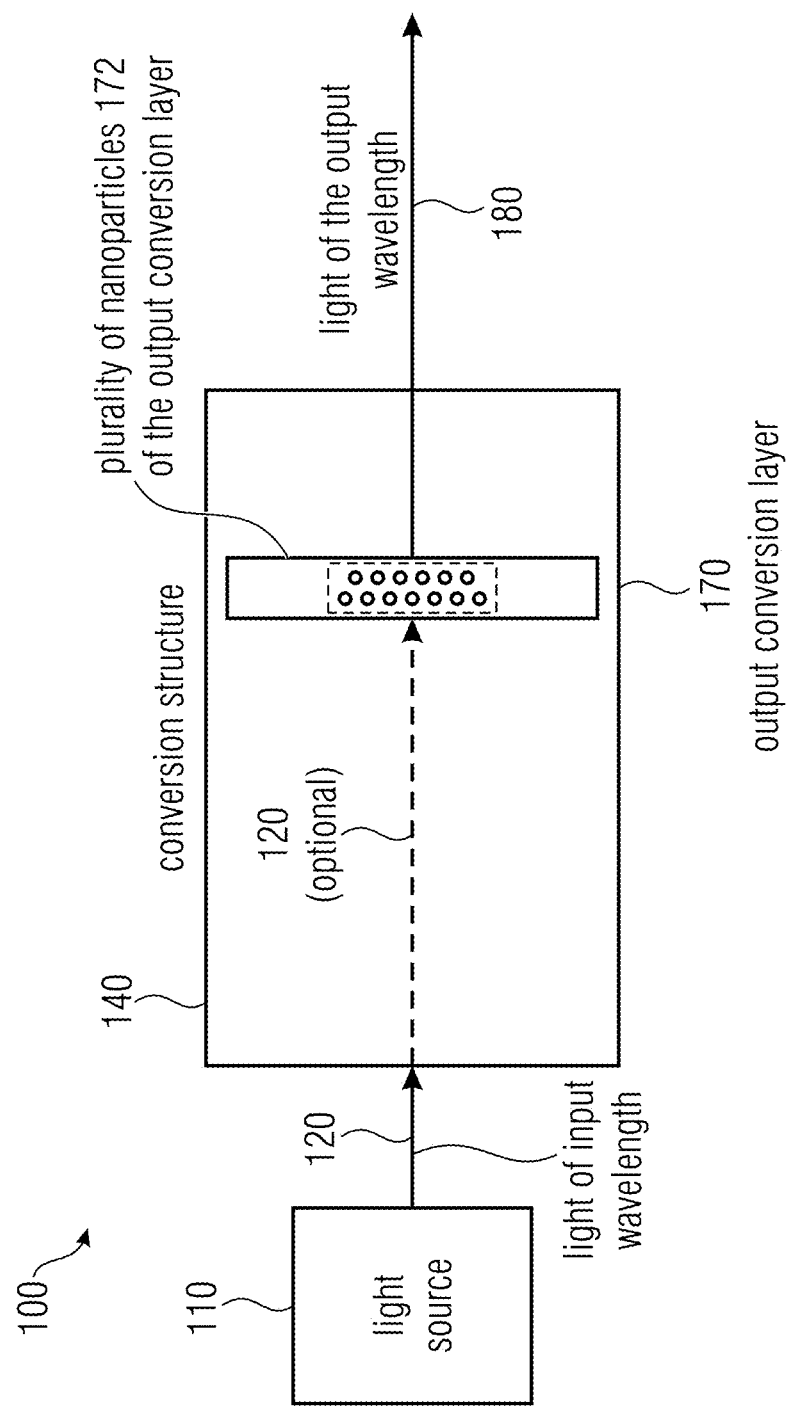
FIG. 1 shows a schematic representation of a light emitting structure according to an embodiment.

FIG. 1 illustrates a light emitting structure 100 for a PAS sensing device for sensing a target gas according to an embodiment. The light emitting structure 100 comprises a light source 110. The light source 110 is configured for emitting light 120 of an input wavelength, which may also be referred to as input light 120 in the following. Throughout this description, the term light may refer to any electromagnetic radiation, for example electromagnetic radiation in the infrared, the visible or the ultraviolet spectrum. For example, the light source 110 may emit light of a wavelength according to an emission spectrum of the light source 110. For example, the emission spectrum of the light source 110 may have one or more emission bands which may be characterized by a specific width. For example, the input wavelength is a wavelength within an emission band of the emission spectrum of the light source 110. The light emitting structure 100 further comprises a conversion structure 140. The conversion structure 140 is configured for absorbing light 120 of the input wavelength and emitting light 180 of an output wavelength. For example, the conversion structure 140 may convert the light 120 of the input wavelength emitted by the light source 110 at least partially into light 180 of the output wavelength, which may also be referred to as output light 180 in the following. The output wavelength is adapted to an absorption wavelength of the target gas. For example, an absorption wavelength of a material or a component may refer to a wavelength of light which may be efficiently absorbed by the material or the component. The conversion structure 140 comprises an output conversion layer 170 that comprises a plurality of nanoparticles 172. The nanoparticles 172 are configured for emitting light of the output wavelength 180, for example after absorbing light that irradiates the nanoparticles 172.

Thus, embodiments describe a light emitting structure 100 configured for emitting light 180 of the output wavelength. Embodiments of the present disclosure rely on the idea that nanoparticles that are irradiated with an incident light (or a primary radiation) of an incident wavelength may efficiently absorb the incident light and may subsequently emit light of an emission wavelength (e.g., secondary radiation) which may be different from the incident wavelength, for example due to up conversion or down conversion processes in the nanoparticles. Thus, the nanoparticles may convert light of the incident wavelength into light of the emission wavelength. For example, an efficiency of the absorption of incident light of a specific incident wavelength may depend on a type of the nanoparticles, which may, for example, be characterized by a material or a geometry, e.g. a size, of the nanoparticles. The dependence of the absorption efficiency on the incident wavelength may be described by an absorption spectrum. Similarly, an emission spectrum of the nanoparticles may describe a spectrum of emission wavelengths emitted by the nanoparticles after absorption of the incident light. The emission spectrum may also depend on the type of the nanoparticles. Thus, the type of the nanoparticles may be adapted for emitting light of a specific wavelength, e.g. the output wavelength.

According to an embodiment, the nanoparticles of a specific type comprise a luminescent material, wherein the luminescent material and a size of the nanoparticles of the specific type are adapted so that the nanoparticles of the specific type are configured for absorbing light of a specific absorption wavelength and/or for emitting light of a specific emission wavelength.

For example, the nanoparticles may comprise a semiconducting material, or a material comprising optically active sites. For example, the nanoparticles may comprise quantum dots or may form quantum dots. In the following, the term quantum dot may be used equivalent to the term nanoparticle.

In other words, quantum dots may be tiny particles of semiconductor substances having sizes in the range of few nm. Based on their properties quantum dots may be seen intermediate to bulk semiconductors substances and individual atoms or molecules. Due to their singularity and discrete state they may also be referred to as artificial atoms. They may exhibit optoelectronic properties, like photoluminescence and electroluminescence, which may be functions of both their size and shape. For example, larger sized quantum dots may emit longer wavelengths than quantum dots of smaller sizes. For example, impinging electromagnetic radiation (light from ultra-violate to infrared) on any object may cause a part of the radiation to be absorbed by molecules of said object. This excess energy may excite the molecules to move faster, i.e. they may oscillate at a higher rate causing increase in temperature. On the other hand, in some materials the energy of light, i.e. of photons may be used to move electrons that rotate around the nucleus on a lower-energy but highly stable orbit (valence band) up to a higher-energy but more unstable orbit (conduction band). Such excited electron however, does not necessarily remain into higher energy orbit for long time, but may return to its original low energy orbit or state by radiating excess energy in the form of light. This radiated energy is known as secondary radiation while, an incident energy causing excitation is referred as primary radiation. In semiconducting materials, often such primary irradiation causes the electron excitation leading to its transition from a valence to a conduction band. This may leads to a formation of a hole in the valence band. Such a formation of a hole-electron pair is termed exciton. On recombination of the exciton, i.e. when the electron returns to a valence band and recombines with a hole, the exciton may lose its energy in the form of photonic emission. This may lead to florescence with secondary excitation. That is, a semiconducting molecule in its ground singlet ($S_0$) electronic state (where all electrons are paired) once exposed to impinging light radiation of high energy photon, often exhibit excited singlet state ($S_1$). The lifetime of this excited state may be very short and may be in the range of nano- to pico-seconds. Once this excited state species relaxes, implying that molecule returns to its ground state ($S_0$) by emitting the excess energy in the form of photon, fluorescence may be observed. Therefore, PL-fluorescence may be directly proportional to the lifetime of the excited singlet state. This also means that PL-fluorescence may last as long as the primary excitation lives. More often, a photon of such secondary PL-fluorescence has a different wavelength than the one that led to excitation. In such case, secondary photon may be red shifted; its wavelength is longer than the initial one. This happens because, when an electron is promoted to an electronic excited state, it often ends up in an excited vibrational state as well. Thus, some of the energy put into electronic excitation may be immediately passed into vibrational energy. Vibrational energy, however, doesn't just travel in photons. It can be gained or lost through molecular collisions and heat transfer. In a normal course, the electron might simply drop down again immediately and a photon would be emitted of exactly the same wavelength as of the primary excitation. On the other hand, if the molecule relaxes into a lower vibrational state, some of that initial energy may be lost as heat. When the electron relaxes, the energy difference back to the ground state may be a little smaller. The photon that is emitted may have lower energy and longer wavelength than the initial one. This phenomenon of emission of lower energy photon as a result of PL-fluorescence caused by higher energy exciting photon is known as Stoke's effect and process may be called optical down conversion. In optical down conversion a single primary photon may result into a secondary photon. Contrary, in some materials it may require more photons of higher energy primary radiations to excite and promote electrons from a valence to a conduction band through intermediate bands. This process may be termed as optical pumping. During optical pumping, the primary photons may repeatedly lift the electrons from one intermediate radius to the next; they may pump the electrons to the outer electron radius. The further outside the electron path lies, the higher may be the potential energy of the electron on the path. It may have a higher energy level. A higher difference between two energy levels may imply a higher energy of the photon that is generated when the electron returns to its stable level. This means the energy difference between singlet ground state and singlet excited state may be large, and it may take more primary photons to lift the electron from ground to excited state through intermittent energy levels. However, the electron may return to its singlet ground state ($S_0$) all the way from its singlet excited higher energy state ($S_1$) by emitting a higher energy photon. Therefore, here the PL-fluorescence wavelength may be lower than its primary excitation. This process may be referred as optical down conversion. In other words, the present disclosure may utilize the photoluminescence properties of material particles having sizes in the range of few nm, for example also known as quantum dots, for conversion of light, for example visible/high energy light, to light within a lower energy range through a process called down conversion, and to light within a higher energy range by an opposite process known as up conversion. Firstly, down conversion may turn light of a high energy, e.g. visible light in wavelength range of 400 nm to 700 nm, into light of a lower energy, e.g. of a higher wavelength range, i.e., for example, 800 nm to 5 μm, in order to detect gasses that may absorb near infrared (NIR) to mid infrared (mid-IR) electromagnetic radiation or light. Secondly, up conversion may be effectively employed to cover air pollutants/gasses that are sensitive to a lower wavelength band of 299 nm to 400 nm, for example $NO_2$.

As the conversion structure may convert the input light 120 into the output light 180, the light source 110 is not necessarily required to emit light of the output wavelength. Thus, the conversion structure 140 facilitates a flexible choice of the light source. For example, limitations regarding space and geometry, cost, energy-efficiency and availability may be considered in the choice of the light source 110, as light sources for specific wavelengths, e.g. the output wavelength, may be expensive, hardly available or may have large package sizes.

The possibility to implement a small light source in the light emitting structure 100 may facilitate the implementation of multiple light emitting structures 100 in one PAS sensing device, so that multi-gas sensing of different gasses having different absorption wavelengths may be realized without the need of a tunable optical filter. The tuning ability of such filters comes at the cost of reduced transmissivity, unconfined selectivity as well as asserts limitations in physical form factors leading to a limited and/or infeasible applicability to certain applications like mobile phones etc. Often, such tunable filters employ mechanical or electromechanical moving parts or arrangements, for example to tune or change the filters to achieve desired wavelength of emission. This imparts high maintenance costs, and restricts their usage into space constrained devices like mobile phones and handheld devices. For example, pure mechanical filters are limited to their use in miniaturized & mobile applications due to their comparatively bulky size and construction. Also, the moving parts or components employed in their construction, limit their usage in safety-critical applications where mean-time-between-failure is a critical factor due to less durability and high maintenance. On the other hand, microelectromechanical arrangements may be suitable for miniaturized and handheld applications; however, they are limited in their coverage of overall range of tunable wavelengths or spectra. Further in comparison to non-tunable or fixed wavelength optical filter, tunable filters are less precise because of imprecision implied by their mechanical/electrically achieved mechanical arrangement. At the same time, such filters trade-off selectivity for transmissivity and vice a versa. An, alternate specific wavelength light source, for example semiconductor light emitting diodes (LEDs), can be a good choice for achieving overall efficiency, specificity, endurance together with their ability to incorporate into smaller mobile devices. The problem to this approach is that, the specific wavelength LEDs, are economically very expensive, for example 4.3 μm LED is many fold highly expensive than normal visible spectrum LEDs. Also, in order to achieve different specific wavelengths, such LED's construction grows into size, making it infeasible into mobile applications.

In contrast, the possibility to realize multi-gas detection without a tunable optical filter has the advantage of avoiding these problems. By adapting the output wavelength to the target gas, the light emitting structure may provide a selective excitation of the target gas. As the variety of different types of nanoparticles is high, the output wavelength may be tuned within a large range, for example in a larger range as quartz based tunable filters. Thus, the output wavelength may be adapted to a large variety of different target gasses. As nanoparticles may have a very high quantum yield, i.e. a high efficiency in absorbing incident light and subsequently emitting light, the output conversion layer may convert light very efficiently, thus decreasing the required power of the light emitted by the light source. Therefore, a power consumption of the light source may be low. As the light emitting structure does not necessarily comprise moving and/or mechanical parts, it may be light-weight and easy to maintain, e.g. in contrast to a mechanical rotating wheel filter. For example, it may be resistant to shocks, rough handling, and destruction, e.g. in contrast to a MEMS based solution. Further, the light emitting structure 100 may provide for long-term stability of the spectrum of emitted light, and thus of the selectivity of the excitation of the target gas, e.g. in contrast to quartz based tunable filters. The light emitting structure 100 with the conversion structure 140 provides for a good stability, a long lifetime and a high endurance, e.g. in contrast to mechanical rotating wheel filter. For example, the light emitting structure no may require no calibration of fine tuning during or after operation. In contrast to FPI based filters, the light emitting structure 100 may have a low sensitivity to temperature.

According to an embodiment, the nanoparticles 172 of the output conversion layer 170 are configured for absorbing light 120 of the input wavelength. Thus, the nanoparticles 172 may convert the light 120 of the input wavelength into light 180 of the output wavelength. Thus, this embodiment of the light emitting structure 100 may require only one conversion layer, namely the output conversion layer 170. Therefore, this configuration may be particularly simple, small, and it may have a high conversion efficiency, i.e. a power loss of the conversion of input light 120 into the output light 180 may be small. A configuration of the conversion structure 140 with one conversion layer is indicated in FIG. 1 by the dashed arrow 120.

Figure 2:
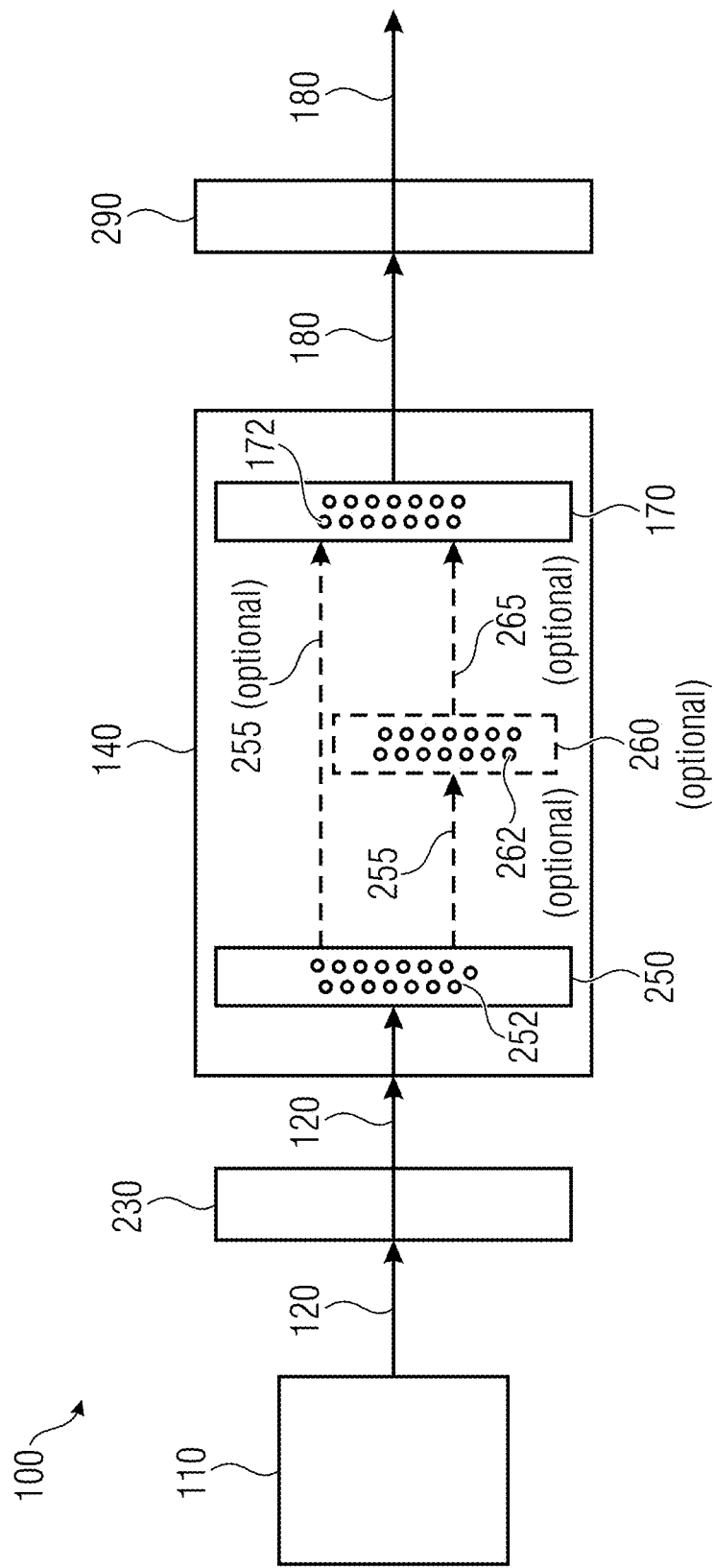
FIG. 2 shows a schematic representation of a light emitting structure according to a further embodiment.

According to a further embodiment of the light emitting structure 100, illustrated in FIG. 2, the conversion structure 140 comprises at least two conversion layers forming a series of conversion layers including an input conversion layer 250 and the output conversion layer 170. The at least two conversion layers comprise respective pluralities of nanoparticles of respective types. That is, each of the at least two conversion layers comprises a plurality of nanoparticles, which may be different from a plurality of nanoparticles of another of the at least two conversion layers. The input conversion layer 250 comprises a plurality of nanoparticles 252, wherein the nanoparticles 252 of the input conversion layer 250 are configured for absorbing light 120 of the input wavelength. Further, an emission wavelength of the nanoparticles of a conversion layer of the series of conversion layers is adapted to an absorption wavelength of the nanoparticles of a subsequent conversion layer of the series of conversion layers, wherein the series of conversion layers starts with the input conversion layer 250 and ends with the output conversion layer 170. For example, the series of conversion layers of the conversion structure 140 may convert the input light 120 successively into the output light 180 in a series of conversion steps, each of the conversion steps being performed by a plurality of nanoparticles of the respective conversion layer.

For example, the nanoparticles 252 of the input conversion layer are configured for absorbing light of the input wavelength 120 and for emitting light of an intermediate wavelength 255. The nanoparticles 172 of the output conversion layer 170 may be configured for absorbing light of the intermediate wavelength 255 and for converting the light of the intermediate wavelength 255 into light of the output wavelength 180. Optionally, the series of conversion layers may comprise one or more intermediate conversion layers 260. The intermediate conversion layer 260 comprises a plurality of nanoparticles 262. The nanoparticles 262 of the intermediate conversion layer 260 may be configured for absorbing light of the intermediate wavelength 255 and for converting the light of the intermediate wavelength 255 into light of a further intermediate wavelength 265. Accordingly, the nanoparticles 172 of the output conversion layer 170 may be configured for absorbing light of the further intermediate wavelength 265.

According to an embodiment, the input conversion layer 250 is arranged between the light source 110 and the output conversion layer 170. Further, the series of conversion layers is arranged along a direction from the input conversion layer 250 to the output conversion layer 170. For example, the conversion layers may be stacked to form a stack of layers. Thus, the conversion structure 140 may have a small form factor, facilitating a space-efficient design of the light emitting structure 100. Further, arranging the series of conversion layers along a direction from the input conversion layer to the output conversion layer may result in a particularly efficient conversion of the input light 120 into the output light 180.

According to an embodiment, the light emitting structure 100 further comprises a collimation lens 230 arranged between the light source 110 and the conversion structure 140. The collimation lens 230 is configured for collimating light emitted by the light source 110 for obtaining a collimated light. Further, the collimation lens 230 is configured for illuminating the conversion structure 140 with the collimated light. Arranging the collimation lens 230 between the light source and the conversion structure 140 may enhance an efficiency of an illumination of the conversion structure 140 by the light source 110, so that an overall efficiency of the light emitting structure 100 may be enhanced.

For example, the collimation lens may be arranged adjacent to a light emitting surface of the light source 110. Further, the conversion structure 140 may be arranged adjacent to the collimation lens 230, so as to improve the irradiation of the conversion structure 140 with the collimated light. According to an embodiment, the collimation lens 230 is a flat lens, for example a Fresnel-like lens. Thus, the collimation lens 230 may be space-efficiently integrated to a stack of layers, which may for example comprise the light source 110, and the conversion structure 140 comprising one or more conversion layers, and optionally also a spectral filter.

It is pointed out that the collimation lens 230 is independent of the implementation of other features of FIG. 2 but may also be implemented in the light emitting structure 100 as shown in FIG. 1. The arrangement of the collimation lens between the light source 110 and the conversion structure 140 may be efficiently combined with an arrangement of the input conversion layer 250 between the light source 110 and the output conversion layer 170.

According to an embodiment, the light emitting structure 100 further comprises a spectral filter 290 which is arranged adjacent to the output conversion layer 170 of the conversion structure 140. The spectral filter 290 is configured for selectively transmitting light 180 of the output wavelength. For example, the spectral filter 290 may be arranged adjacent to a surface region of the output conversion layer 170 facing away from the light source 110. For example, the spectral filter 290 is configured for transmitting light of a wavelength within a range of ±10% or ±5% of the output wavelength, and for attenuating light emitted or transmitted by the conversion layer, which has a wavelength outside of this range. The spectral filter 290 may decrease the requirements to the emission spectrum of the nanoparticles of the conversion layers. For example, the spectral filter 290 may filter a spectrally narrow band of the emitted light around the output wavelength, allowing for a selective excitation of the target gas even in case of a broad emission spectrum of the conversion structure. Thus, the spectral filter 290 grants a high selectivity of the light emitting structure, e.g. in contrast to a quartz based tunable filter, or MEMS based solutions.

For example, the spectral filter is a fixed wavelength band bass filter, for example a Bragg filter or a dielectric filters. Fixed wavelength filters may be inexpensive and may allow for a precise and stable selection of the output wavelength, e.g. in contrast to MEMS based solution. Further, these filters may have a high transmissivity in the transmission range, e.g. in contrast to a usage of MEMS or FPI based solutions. A high transmissivity makes the light emitting structure suitable for both narrow bandwidth and wide bandwidth applications.

According to embodiments, the output wavelength is in a range of +/−10% or +/−5% of one of 4.2 µm, 3.3 µm, 2.7 µm, 2.3 µm, 450 nm, 600 nm, 4.61 µm, 4.02 µm, 3.03 µm, 3.56 µm, 4.47 µm. For example, these wavelengths may be absorption wavelengths of the target gasses $CO_2$, $CH_4$, $H_2S$, $NH_3$, $NO_2$, $O_3$, $CO$, $SO_2$, ethane $C_2H_2$, formaldehyde $CH_2O$, $N_2O$, respectively. Hence, these wavelengths may be used for accurately and efficiently detecting the respective gases.

According to an embodiment, the nanoparticles 172, 252, 262 of at least one conversion layer comprises a core and one or more shells. The core comprises a luminescent material and each of the one or more shells is arranged to enclose the core or the core and one or more other shells of the one or more shells. For example, a first shell may enclose the core and a second core may enclose the first shell enclosing the core. For example, the core may comprise a same material as one of the shells, or the core may comprise a different material than one of the shells. The one or more shells may increase a chemical stability of the nanoparticles, thus preventing degradation. Further, the one or more shells may reduce a number of recombination sites, so that excited charge carries in the core may less probably recombine non-radiatively, therefore enhancing a quantum yield or a conversion efficiency of the nanoparticles.

According to an embodiment, the light source 110 is a light emitting diode (LED) and the input wavelength is in a range between 400 nm and 800 nm or in a range between 500 nm and 700 nm or in a range between 500 nm and 600 nm. For example, the input wavelength is in the visible range of the electromagnetic spectrum.

LEDs in the visible spectrum may be cheap to manufacture and may be particularly small. For example, LEDs in the visible regime may be available with a large variety of emission wavelengths. Thus, the wavelength of the light emitted by the LED may be chosen to be adapted to the conversion structure 140, so that a combination of the light source 110 and the conversion structure 140 enables an efficient generation of the light of the output wavelength 180. LEDs in the visible regime may be available in common package sizes for electronic devices, so simplifying the manufacturing of the light emitting structure. For example, using a light emitting structure 100 comprising a LED may allow for designing a particularly small gas sensing device using PAS may be achieved. For example, such a PAS gas sensing device may be highly scalable for portable and consumer applications like mobile phones, smart watches. Further, small package sizes may enable a small sensing volume, facilitating a high signal to noise ratio and a high quality of detection. However, it should be noted that the lower limit of the size of such devices is not limited by current package sizes but the size of such devices may even be further shrunk in size by means of non-standard packages of components. Using a LED the visible regime may avoid an implementation of the light source with a heating element involved, so that direct heat dissipation may be avoided. Also, thermal acoustic noise may be avoided. Thus, an overall intrinsic noise profile may be very low, providing for a steady and robust performance. The usage of a visible regime LED further avoids the problem of decaying luminescence, for example compared to an IR heater. Additionally, the LED may be a very energy efficient light source. Thus, LEDs are space-efficient, e.g. in contrast to applications of quartz based tunable filters, mechanical rotating wheel filters, IR heaters with optical filters, and FPI based tunable filters, in particular when combined with MEMS. Further, LEDs, in particular semiconductor/silicon LEDs may have a long lifetime and endurance (e.g., 50000 hrs. to 60000 hrs. avg.,), especially compared to IR heaters, allowing for lower power budgets to achieve same intensity over a period. Finally, a LED may be quickly modulated in intensity, in contrast to thermal light sources such as IR heaters. This is because, such heater needs to be heated up to a temperature where it can emit required wavelength. Modulating intensity, hence will not give appropriate wavelength emission. The light emitting structure 100 facilitates the implementation of a LED as light source 110, so that the light emitting structure 100 allows for a fast modulation of the output light 180. This fast modulation may enhance the accuracy of a PAS measurement, in particular in the presence of acoustic noise.

In other words, the light emitting structure 100 may convert an economically cheap traditional visible light LED into the desired wavelength light sources for PAS based gas sensing. This makes the light emitting structure 100 many folds cheaper economically compared to the state of art PAS sensing devices employing direct NIR or mid-IR light sources, that are bulky as well as expensive.

For example, the LED may be chosen to primarily emit light of the input wavelength, that is, to emit light within a band around the input wavelength with a width of, for example, ±10% or ±5% of the input wavelength. Thus, a high ratio of the emitted spectrum of the LED may be absorbed by the conversion structure, enhancing the energy-efficiency of the light emitting structure 100.

According to an embodiment, the conversion layer 170, 250, 260 may comprise a polymer material. For example, the nanoparticles of the conversion layer may have the form of a powder and may be embedded in the polymer material so as to fix the nanoparticles. Thus, a manufacturing process of the conversion layers may be cost efficient and the conversion structure may be light-weight.

Figure 3:
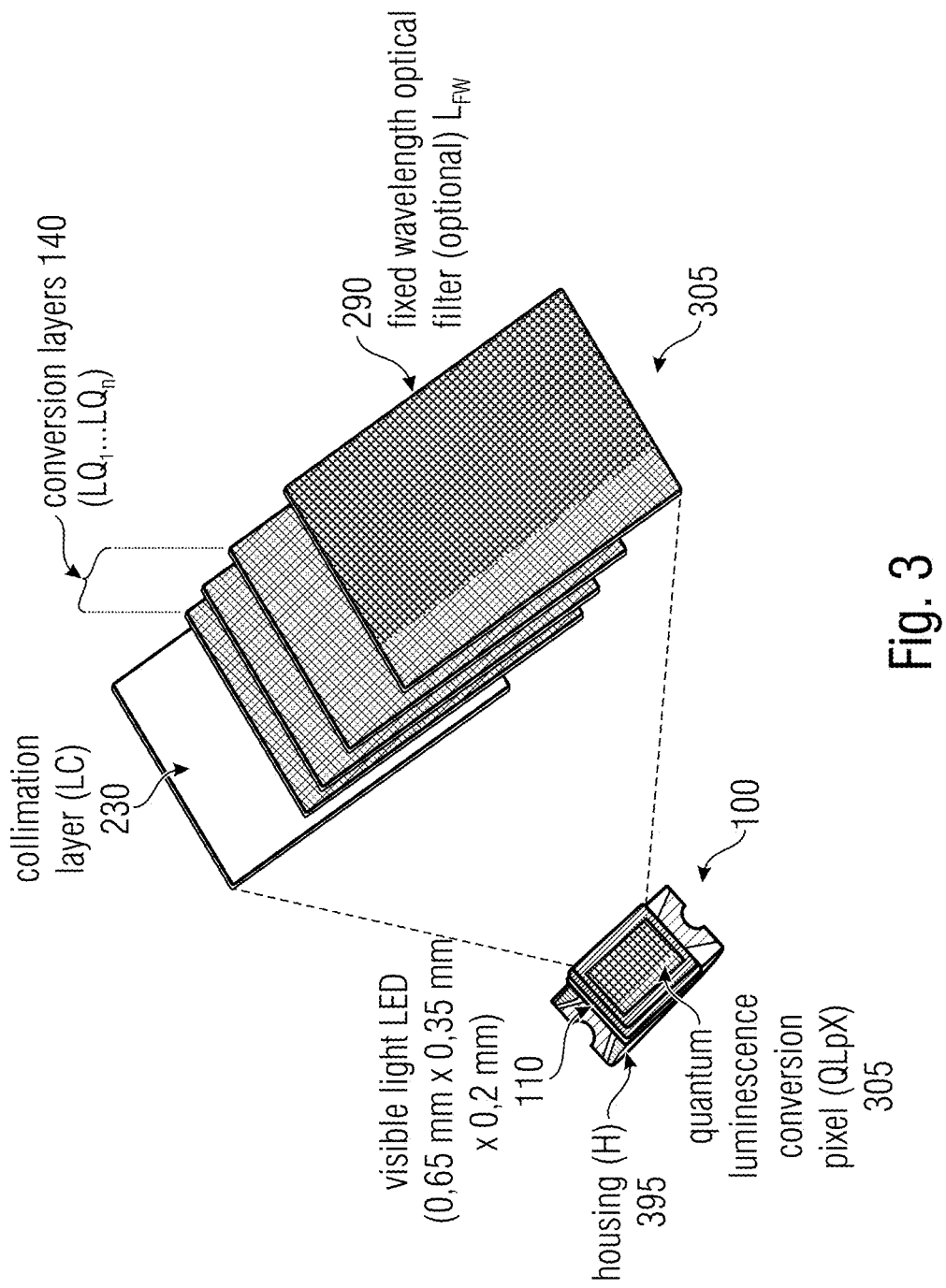
FIG. 3 shows a schematic representation of a light emitting structure according to a further embodiment.

FIG. 3 illustrates an exemplary arrangement of the light emitting structure 100 according to an embodiment. For example, the light emitting structure 100 comprises a quantum luminescence conversion pixel (QLpX) 305. The QLpX 305 comprises the collimation lens 230, e.g. a collimation layer (LC), as a base layer for a stacked construction of the QLpX 305. The light emitting structure 100 may further comprise a visible light LED as the light source 110, which may have dimensions of 0.65 mm×0.35 mm×0.2 mm. However, the LED may also be smaller or larger. The collimation lens 230, on exposure to the LED's illuminating surface, e.g. on exposure to the input light 120, may convert the incident visible radiation, e.g. the input light 120, into a confined and focused beam at its other end, for example focused on the conversion structure 140, or into a collimated beam illuminating a surface region of the conversion structure 140 facing the light source 110. For example, the collimation lens 230 may be a Fresnel's lens construction or other means to collimate the light emitted by the light source 110, for example without blocking it. For example, the purpose of the collimation layer LC may be to focus incoming light rays and increase the resolution. This focused beam, or collimated beam, is then passed through the series of conversion layers $LQ_1, \ldots LQ_n$, e.g. of the conversion structure 140. For example, $LQ_1$ may represent the output conversion layer 170, and $LQ_n$ may represent the input conversion layer 250, wherein n represents the number of conversion layers. Every conversion layer may be responsible for converting incident radiation/light $I_1$ into resultant radiation $R_1$, for example by means of either a process of up conversion or down conversion. Every conversion layer may be made up of material comprising quantum dots with different configurations. Here, configurations may imply molecules involved, type, size, shape & core/shell structuring etc. The number of conversion layers may be a function of a number of conversion steps involved in converting an incident light spectrum, e.g. the light of the input wavelength 120, into a desired light spectrum, e.g. the light of the output wavelength 180. Finally, the construction of the QLpX 305 may be concluded with optional fixed wave narrow band pass optical filter, e.g. the spectral filter 290. This filter may be required to limit incident band of radiation, e.g. light emitted or transmitted by the conversion structure 140, to a more confined desired wavelength centric emission, e.g. an emission of a narrow band centered around the output wavelength. For example, if in a final conversion step a filter, e.g. the output conversion layer 170, is emitting light within a band of the light spectrum from 4.2 µm to 4.7 µm, then the filter 290 may optionally be employed to emit only 4.3 µm radiation that may be desired for $CO_2$ gas sensing.

According to an embodiment, the light emitting structure 100 comprises a housing 395 and a QLxP 305 comprising the conversion structure 140, and optionally the spectral filter 290. The housing 395 may be arranged to enclose the QLpX 305, except for a main surface region of the conversion structure 140 that faces the light source 110 or that is arranged adjacent to the light source 110. Optionally, the QLpX 305 may further comprise the collimation lens 230, and the housing 395 may enclose the QLpX 305 except for a main surface region of the collimation lens 230 that faces the light source 110 or that is arranged adjacent to the light source 110. The housing 395 may have a highly reflecting coating at the inside, e.g. the inside of its walls. Thus, the housing 395 may reflect light leaving the conversion structure 140 so as to increase the light density in the conversion structure. Thus, the housing 395 may increase internal reflections for improved luminance. For example, the reflective coating may transmit light of the output wavelength 180. In another example, the housing is arranged so that light emitted by the output conversion layer 170 may exit the housing. According to an example, the QLpX 305 can be held with the help of a housing (H) 395 that may cover the illuminating exposure of the visible light LED.

In other words, the present disclosure utilizes photoluminescence properties, particularly fluorescence properties of said quantum dots in order to convert light, for example visible light, into light within a desired range of the electromagnetic radiation or light spectrum for detection of gas using the PAS principle. Thus, examples of the disclosure may describe an optical construction termed as "Quantum Luminescence Conversion Pixel (QLpX)", as for example shown in FIG. 3, for example the light emitting structure 100 shown in FIG. 1.

In other words, embodiments of the present disclosure may employ both up conversion and down conversion in a series of conversions to transform a light, for example visible primary light, into following radiations for detection of corresponding gasses.

According to an embodiment, at least one of the conversion layers 170, 250, 260 comprises a plurality of strands 1342, 1344 of a polymer material, wherein the strands 1342, 1344 comprise the nanoparticles 172, 252, 262 of the at least one of the conversion layers 170, 250, 260. The plurality of strands 1342, 1344 comprises at least two types of strands having different concentrations of the nanoparticles 172, 252, 262 of the at least one of the conversion layers 170, 250, 260. Further, strands of different types are arranged alternately within the at least one of the conversion layers 170, 250, 260. The alternating arrangement of strands with different concentrations of the nanoparticle may increase a quantum yield of the conversion layer, i.e. a conversion efficiency of the conversion layer may be enhanced compared to a uniform distribution of the nanoparticles.

For example the strands 1342, 1344 have a cylindrical form and the axes of the strands 1342, 1344 may be arranged parallel to each other and within a plane that is parallel to a main surface region of the conversion layer comprising the strands. For example, the strands may have diameters in a range between 1 μm and 50 μm or in a range between 2 μm and 20 μm or in a range between 5 μm and 10 μm.

Figure 13:
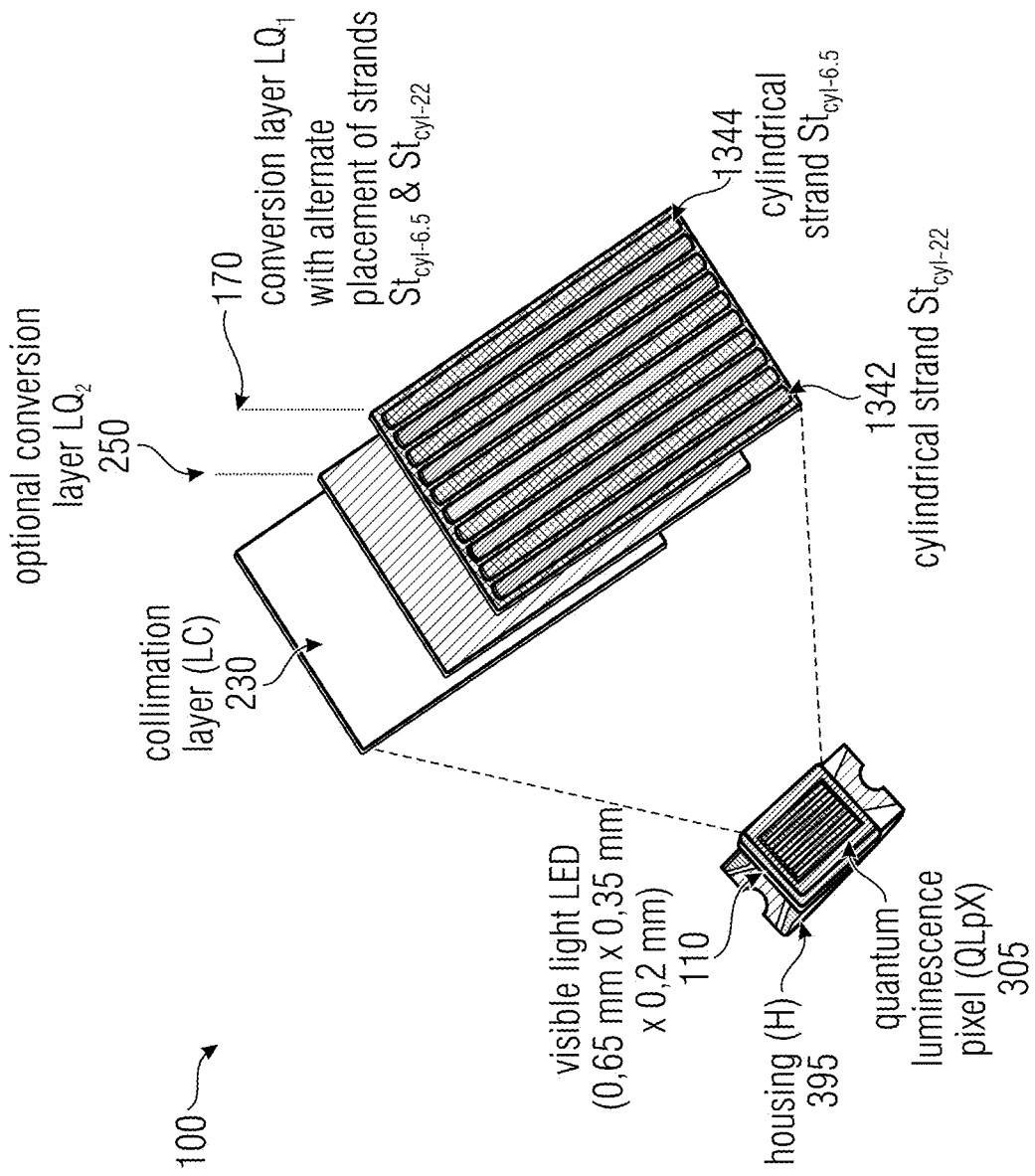
FIG. 13 shows a schematic representation of a light emitting structure according to a further embodiment.

FIG. 13 illustrates an arrangement of the light emitting structure 100 according to an embodiment, in which the output conversion layer 170 comprises a first type of strands 1342 and a second type of strands 1344, the two types of strands comprising different concentrations of the nanoparticles 172 of the output conversion layer. It is pointed out, that any of the conversion layers of the conversion structure 140 may comprise a plurality of strands 1342, 1344 independently from other conversion layers of the conversion structure 140.

In the following, embodiments of the conversion structure 140 or the QLpX 305 comprising the conversion structure 140 and the spectral filter 290 are specified in detail, each embodiment describing an example for adapting the output wavelength of the light emitting structure 100. In the shown embodiments, the output wavelength is matched to specific absorption wavelengths of a number of gasses; however, other configurations of the light emitting structure may comprise another output wavelength which, for example, match other absorption wavelengths of said gasses or other materials, such as particles. In other words, shape and/or construction material and/or method of deposition of QDs constituents might yield different possibilities of construction of the QLpX 305.

Embodiments of the conversion structure 140 may implement various configurations of conversion layers which may represent the output conversion layer 170, the input conversion layer 250, the intermediate conversion layer 260 or a conversion layer of the series of conversion layers. To start with, several exemplary configurations of the conversion layers are specified; however, the suggested materials and geometries for the nanoparticles of the conversion layers are to be understood exemplarily.

Examples of Conversion Layers

A conversion layer A comprises a plurality of nanoparticles of type A. The nanoparticles of type A comprise a core comprising a material of 3 mol % $Co^{2+}$:doped $Co^{2+}$:ZnSe. The nanoparticles of type A further comprise a shell comprising a ZnSe material. In other words, conversion layer A may constitute 3 mol % $Co^{2+}$:doped $Co^{2+}$:ZnSe/ZnSe (core/shell) quantum dots. For example, the nanoparticles of type A may comprise a uniform morphological cubic sphalerite structure. The nanoparticles of type A may comprise a high mono-dispersity, for example with diameter in range of 8 nm to 26 nm. The design of a core/shell structure may protect the $Co^{2+}$ ions from quenching centers including hydroxyl groups and $H_2O$ molecules and may reduce an assemblage.

For example the nanoparticles, for example the nanoparticles of type A, but also other types of the described types of nanoparticles, may be synthesized by a hydrothermal method. Post synthesis, semiconductor crystals, e.g. the nanoparticles, may be exposed to heat, for example to a temperature in a range between 300° C. and 500° C., e.g. 400° C., to improve photoluminescence (PL) or fluorescence intensity. For example the treatment with heat may enhance the PL by a factor of almost 80 compared to an untreated sample. A post-heat treatment process may be employed in order to further reduce surface quenching centers and crystal defects. For example, these crystals, e.g. the nanoparticles of type A which may have a mid-IR emission at room temperature, are prepared in powder form. For example, for preparing the output conversion layer 170, the powder may be deposited over a bottom layer i.e. $LQ_1$, directly or over a transparent dielectric non-reactive surface that is stacked over $LQ_1$. Alternatively, the powder comprising the nanoparticles may be mixed with a polymer for preparing a conversion layer.

Figure 4A:
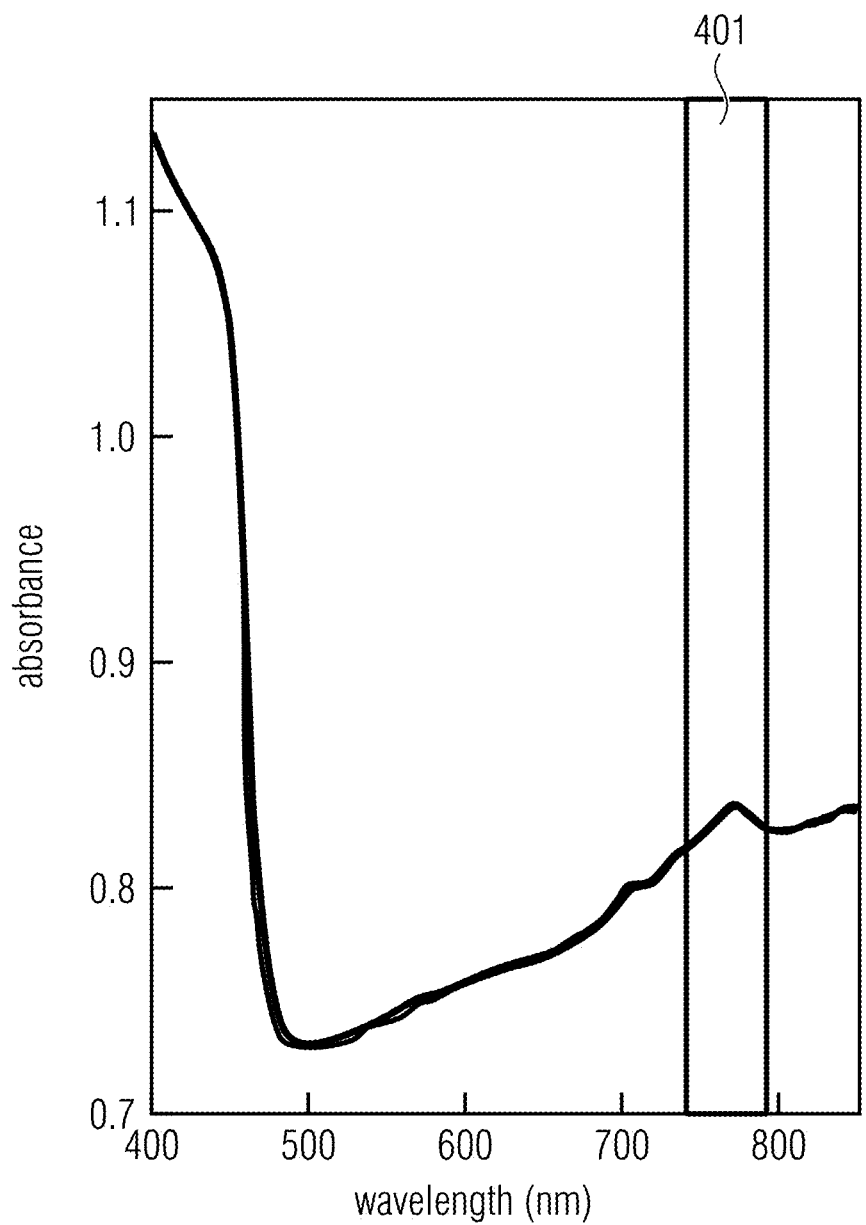
FIG. 4A shows an exemplary absorption spectrum of nanoparticles of type A.
Figure 4B:
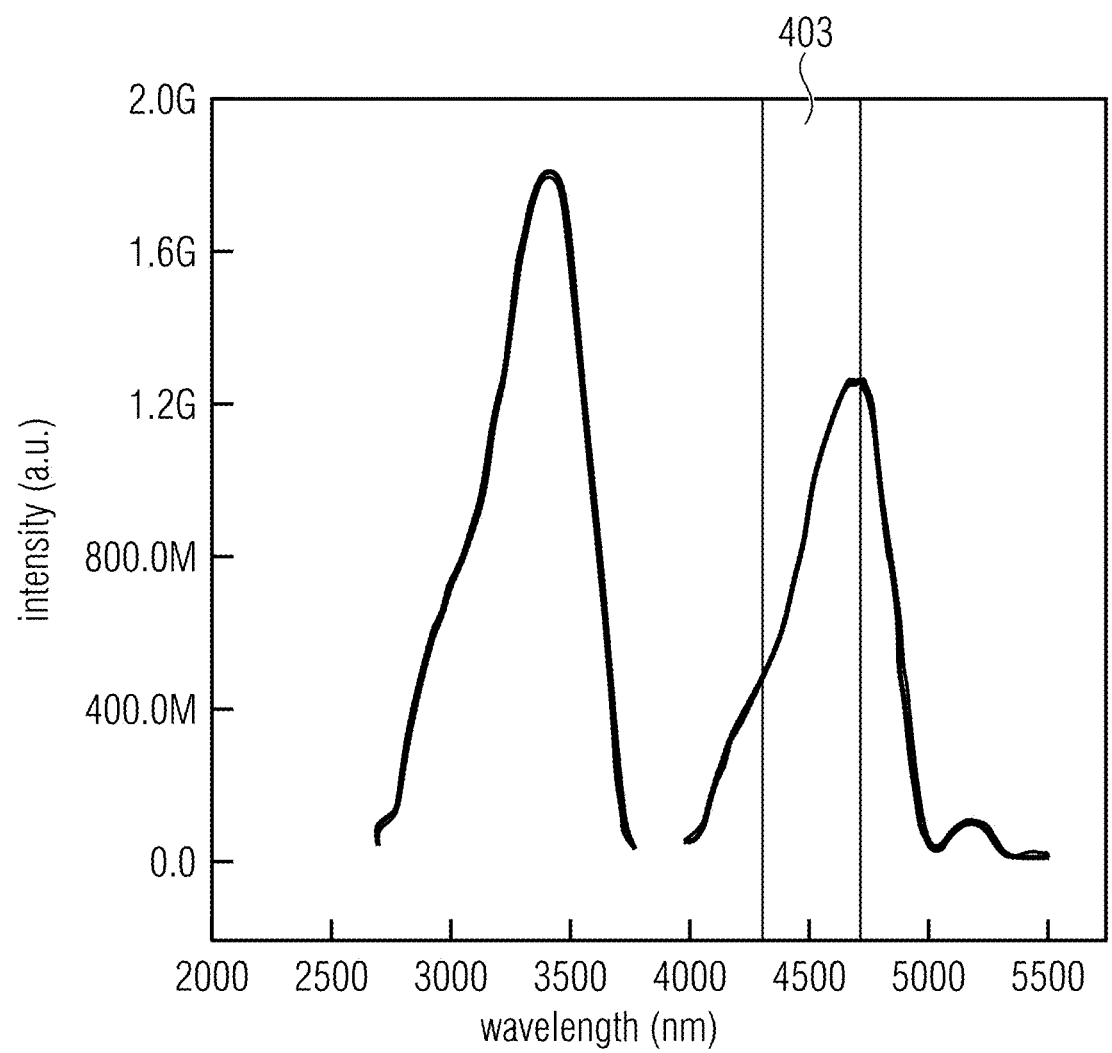
FIG. 4B shows an exemplary emission spectrum of nanoparticles of type A.

FIG. 4A shows an exemplary diagram of the absorbance of light by the nanoparticles of type A in dependence on the wavelength of the light. As may be seen in FIG. 4A, the absorption of the nanoparticles of type A may be considerably higher for wavelengths in the range between 400 nm to 480 nm. Also, from 500 nm the absorption may almost linearly increase till 750 nm. At 770 nm it may show a local maximum, c.f. range 401 in FIG. 4A. Thus, a range of interest for the wavelength of primary irradiation of the layer, e.g. radiation to be absorbed by the conversion layer A, may be 400 nm to 480 nm. FIG. 4B shows an exemplary spectrum of the PL emitted by the nanoparticles of type A when irradiated with light of a wavelength of 770 nm.

Figure 5:
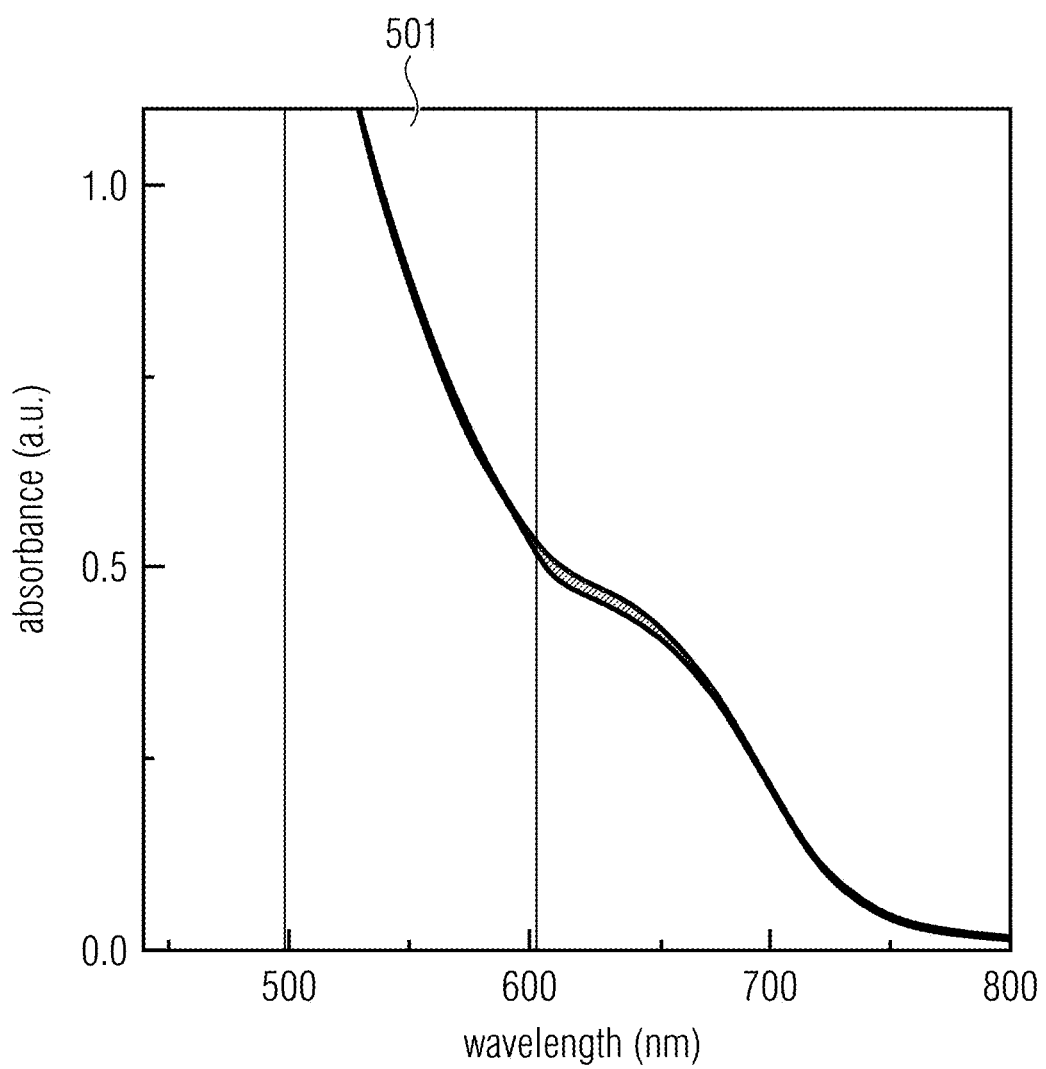
FIG. 5 shows an exemplary absorption spectrum of nanoparticles of type B.

A conversion layer B comprises a plurality of nanoparticles of type B. The nanoparticles of type B are CdTe inorganic nanocrystals, which may have diameters in a range of 5 nm to 7 nm. For example, these quantum dots may be prepared with hydrothermal method, e.g. as described above, in powder form and may for example be grown over a synthesis time of 43 minutes. FIG. 5 shows an exemplary absorption cross-section of CdTe inorganic nanocrystals in UV to Visible spectrum, e.g. an exemplary absorption spectrum of the nanoparticles of type B. The nanoparticles of type B and may comprise a prominent absorption in a visible range of 500 nm till 600 nm, indicated as range 501 in FIG. 5, and may have a corresponding high quantum yield (QY), for example a QY of about 75%, of PL intensity centering at 770 nm with bandwidth of ±5 nm. The nanoparticles of type B may comprise a core comprising a CdTe material and may comprise one more shells, for example a first shell comprising a CdSe material, the first shell enclosing the core, and a second shell, comprising a ZnS material, the second shell enclosing the first shell with the core enclosed. In other words, the nanoparticles of type B may have a CdTe/CdSe/ZnS (core/shell/shell) configuration or any other core/shell configuration, e.g. a combination of a core and one or more shells, in order to improve their stability, e.g. their chemical stability.

Figure 6:
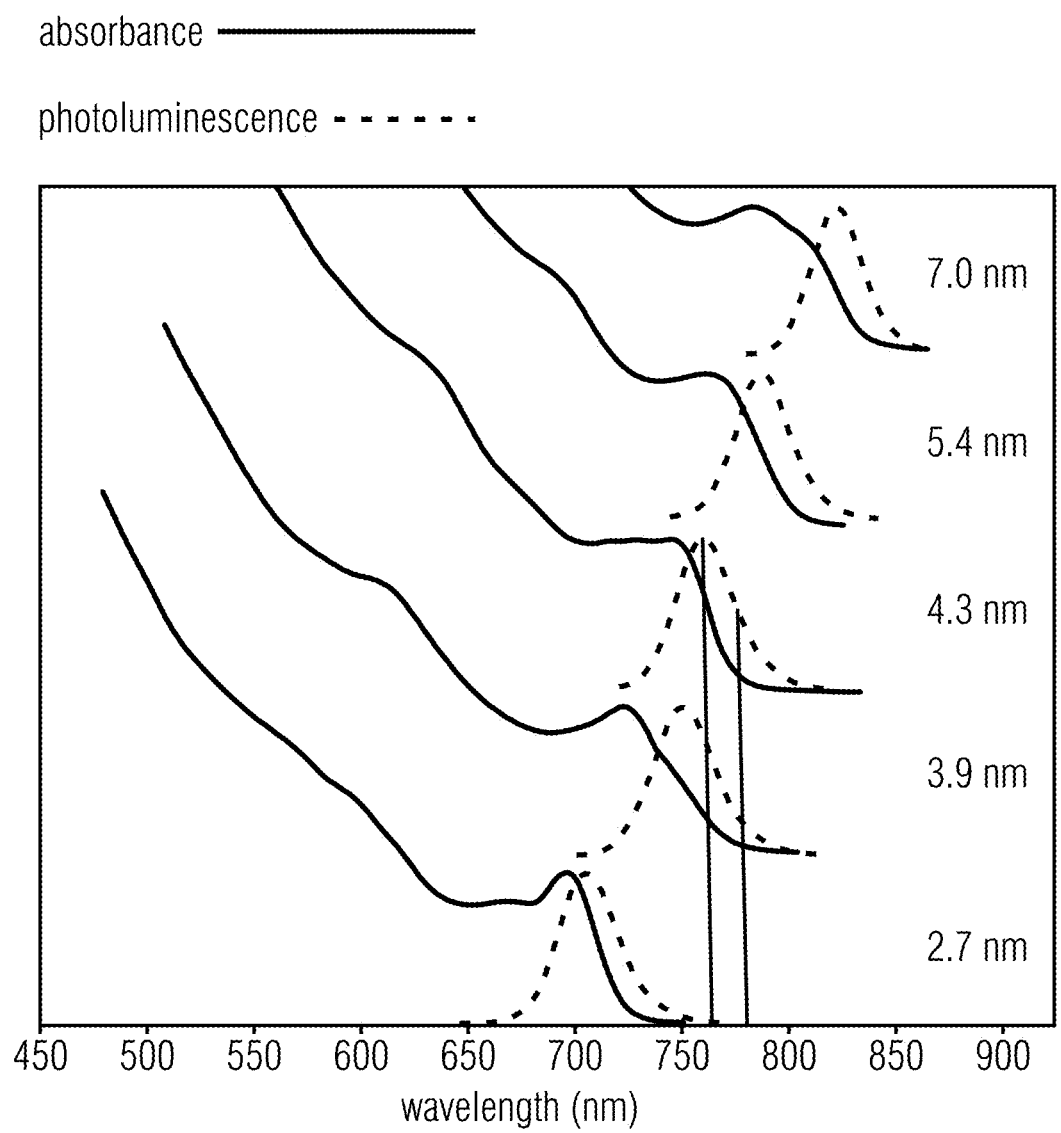
FIG. 6 shows exemplary absorption and emission spectra of nanoparticles of type C.

A conversion layer C comprises a plurality of nanoparticles of type C. The nanoparticles of type C are CdSeTe alloyed QDs, for example with diameters in a range between 4.4 nm and 4.7 nm. For example, the nanoparticles of type C may be coated with tri-n-octyl phosphine oxide or mercaptoacetic acid. These QDs may have strong absorption in the wavelength range of 500 nm till 700 nm. Also they exhibit high PL QY. FIG. 6 shows exemplary absorption and emission spectra of the nanoparticles of type C in dependence on their size.

Figure 7:
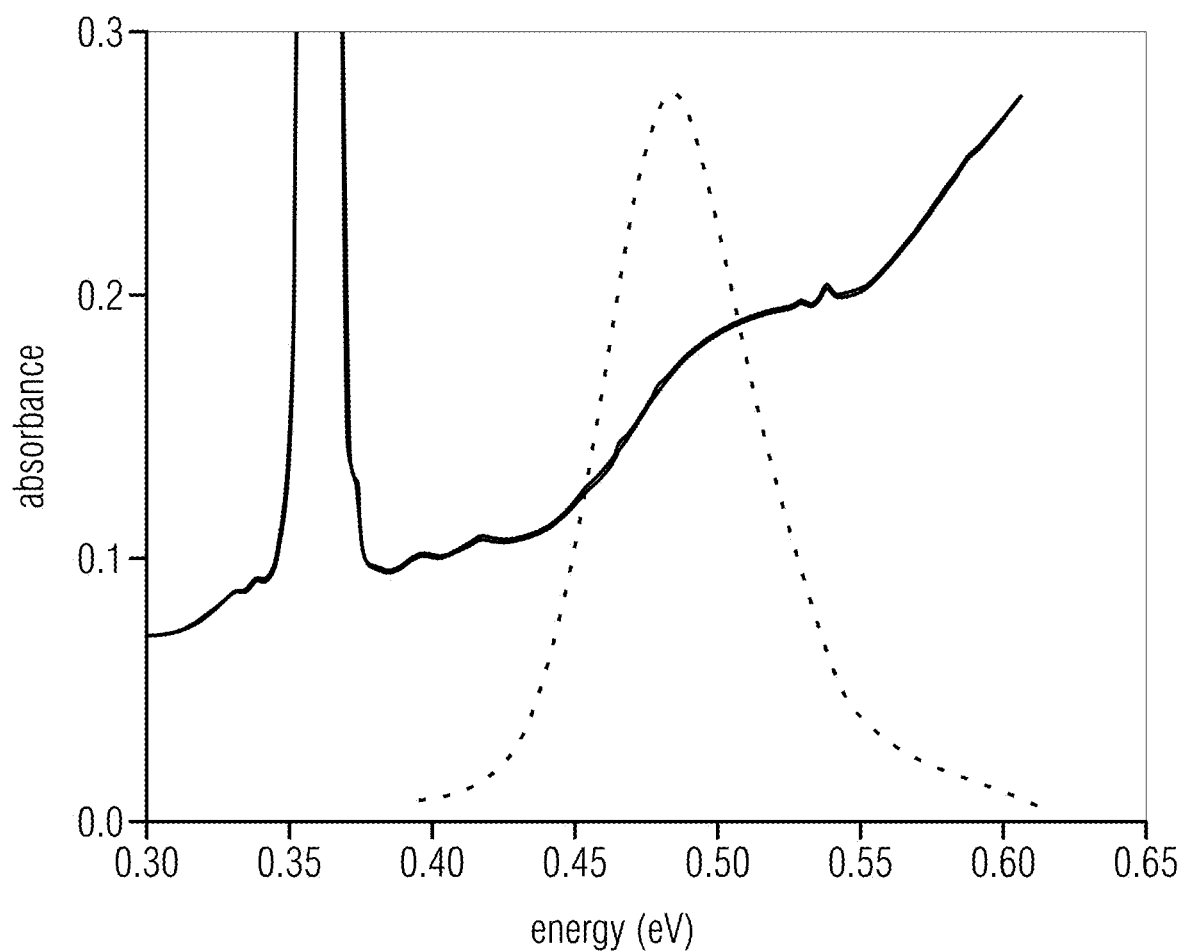
FIG. 7 shows exemplary absorption and emission spectra of nanoparticles of type D.

A conversion layer D comprises a plurality of nanoparticles of type D which are quantum dots comprising a core comprising a PbSe material and a shell comprising a CdSe material. For example, the nanoparticles of type D may have a diameter of 8.9 nm±1.1 nm and may have a spherical form. In the core/shell configuration, the nanoparticles of type D may have a quantum yield of about 78% compared to nanoparticles having only the core with the PbSe material. This effect is due to inorganic passivation, as a shell comprising a material with a higher band gap, for example CdSe, increases the PL intensity, e.g. as much as 6 to 8 times compared to the core only counterpart with a small band gap. The nanoparticles of type D may emit light with peak emission energy of 0.54 eV, i.e. 2296 μm which matches approximately the absorption wavelength of 2.3 μm of $NH_3$, thus being appropriate for $NH_3$ gas detection. The nanoparticles of type D, hence may be required to be irradiated ideally in the lower part of the mid-IR range. FIG. 7 shows an exemplary mid-IR absorption spectrum for PbSe quantum dots without a CdSe shell as solid line. The dotted line shows an exemplary PL spectrum of these nanoparticles for corresponding primary absorption.

A conversion layer E comprises a plurality of nanoparticles of type E comprising a lead selenide (PbSe) material and having a coating of stabilizing oleic acid legands. The nanoparticles of type E may have a dimeter of 5 nm±1 nm. FIG. 8A shows an exemplary absorption spectrum of the nanoparticles of type E. The nanoparticles of type E may emit PL with a peak wavelength of 1800 nm, corresponding to 0.68 eV, on primary irradiation, as indicated in the exemplary PL emission spectrum shown in FIG. 8B.

Figure 9B:
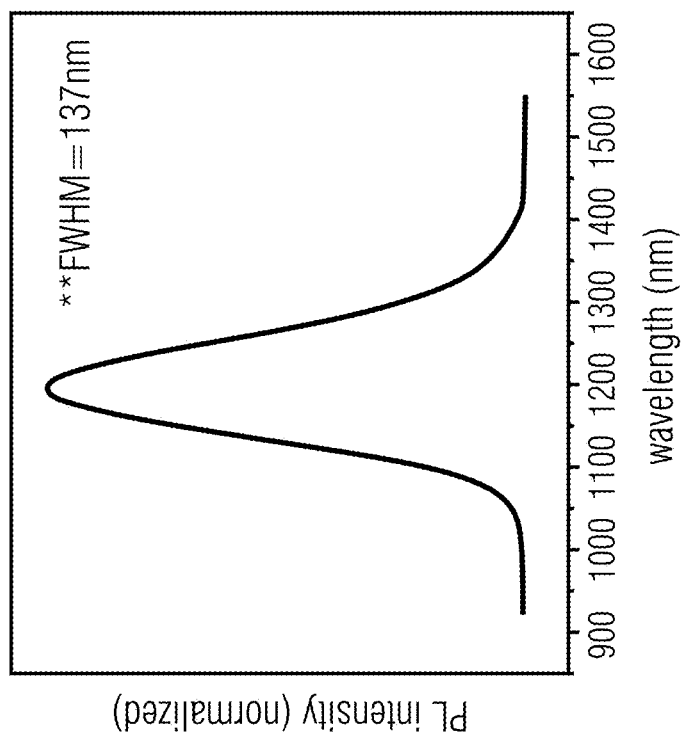
FIG. 9B shows an exemplary emission spectrum of nanoparticles of type F.
Figure 9A:
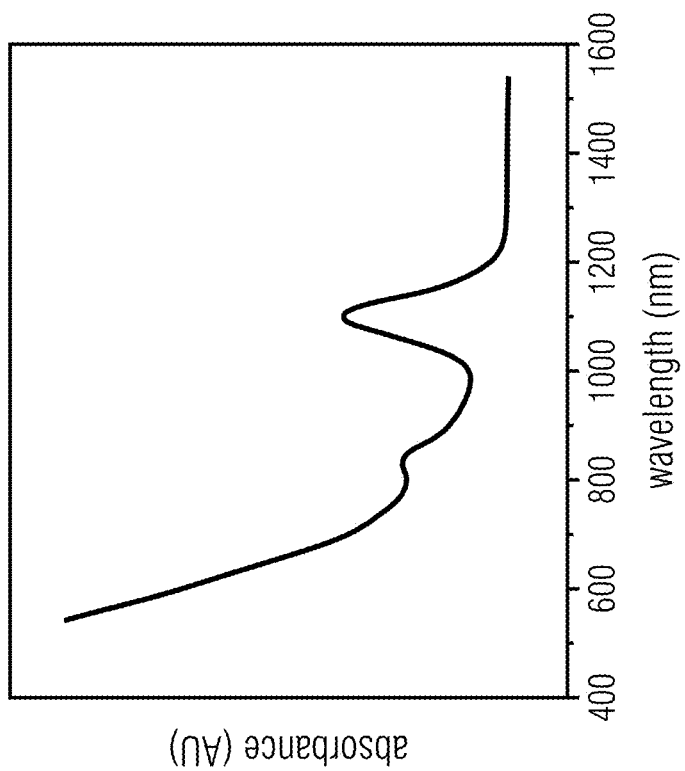
FIG. 9A shows an exemplary absorption spectrum of nanoparticles of type F.

A conversion layer F comprises a plurality of nanoparticles of type F comprising a lead selenide (PbSe) material and having oleic acid ligands as stabilizing coating. The nanoparticles of type E may have a dimeter of 2.9 nm±1 nm. FIGS. 9A and 9B show exemplary absorption and emission spectra of these QDs, respectively. The nanoparticles of type F may have a high absorption in the visible range from 520 nm, which is green light, to 590 nm, corresponding to yellow light. The emission of these nanoparticles may center around 1200 nm.

Figure 12:
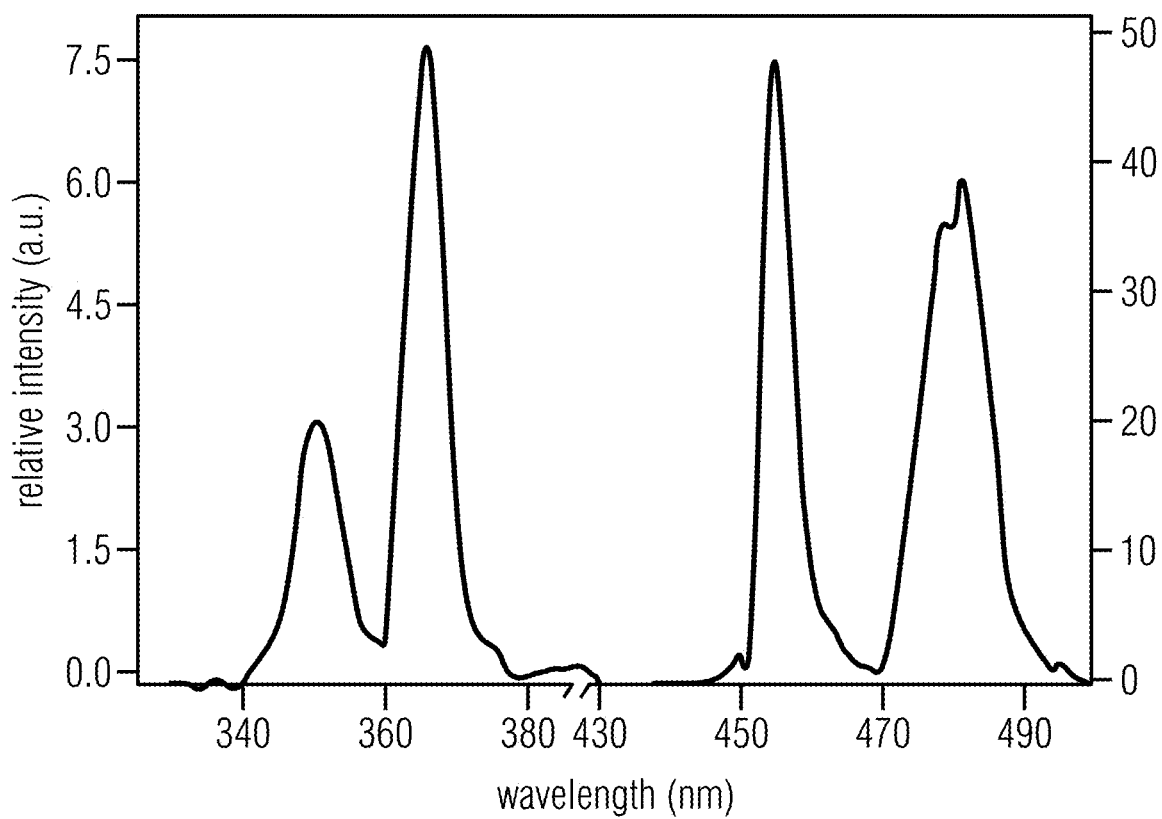
FIG. 12 shows an exemplary emission spectrum of the conversion layer G.

A conversion layer G comprises a plurality of nanoparticles of type G comprising a core comprising a $NaYF_4$:Yb, Tm material and a shell comprising a $NaYF_4$ material, or consisting of a $NaYF_4$:Yb/Tm@$NaYF_4$ core/shell material. The nanoparticles of type G comprising $Tm^{+3}$ may offer a long ladder like energy level structure with a suitable energy gap to support multiphoton pumping based optical up-conversion process; while $Yb^{3+}$ has excellent absorption response to near infrared (NIR) primary radiation supporting clean energy transfer to intermediate steps of $Tm^{+3}$ energy ladder. For example, the nanoparticles of type G may have a length and a width of 43 nm+/−3 nm and 23 nm+/−1.5 nm, respectively. For example, the nanoparticles of type G may be synthesized by keeping a concentration of $Yb^{+3}$ to $Tm^{+3}$ at 40:1 mol %. FIG. 12 shows an emission spectrum of an embodiment of the conversion layer G when excited with radiation of a wavelength ranging from 900 nm to 1000 nm, e.g. with photon pumping primary radiation in near infrared region.

A conversion layer H comprises a plurality of nanoparticles of type I comprising a core comprising a PbS material and a shell comprising a CdS material. The PL intensity of the nanoparticles of type I may peak at 950 nm±50 nm, and the nanoparticles of type I may have a high absorption of light with a wavelength in the visible range between 520 nm and 590 nm. The QY for the conversion layer H may be improved by means of reducing the defects caused by CdS shell. For example, the CdS shell may reduce a number of defects at the surface of the core, such increasing the QY of the conversion layer H. For example, the nanoparticles of type I may achieve a quantum yield of more than 75%. For example, the PL emission of the nanoparticles of type I may have a full width at half maximum (FWHM) of 130 nm±20 nm, with a peak emission in the range of 950 nm±25 nm. In other words, the large value of 130 nm±20 nm for FWHM pertaining to PL emission shows a broad emission in the range 950 nm±25 nm with almost same intensity as peak.

A conversion layer I comprises a plurality of nanoparticles of type J comprising a core comprising a CdTe material, further comprising a first shell comprising a CdSe material and further comprising a second shell comprising a ZnS material. For example, the nanoparticles of type J may have diameters in the range of 4.5 nm to 6 nm and may have a PL emission peaking at 600 nm±5 nm. For example, these nanoparticles may have a QY≥90%, and a FWHM≤35 nm.

Exemplary configurations of the conversion structure 140 and the QLpX 305

A first configuration of the QLpX 305 is referred to as QLpX-1 and is configured to emit light of the output wavelength 180 of 4.2 μm, being in the mid-IR spectrum. For example, an absorption cross-section of $CO_2$ may be particularly high or highest in a range around this wavelength. Therefore, the QLpX-1 may be required to emit light of the output wavelength of 4.2 μm, e.g. light with a wavelength in a confined band, e.g. a band of ±5% or ±10% the output wavelength, upon absorbing light of the input wavelength, the input wavelength being in the visible range. The spectral filter 290 of the QLpX-1 has a center wavelength of 4.2 µm.

The QLpX-1 comprises the layer $LQ_1$, i.e. the output conversion layer 170, a visible light LED, e.g. the light source 110, a bottom collimation layer (LC), e.g. the collimation lens 230, and a fixed wavelength optical filter section, e.g. the spectral filter 290, at top. The following embodiments of the QLpX-1 may use up to two conversion layers. The output conversion layer 170 of the QLpX-1 is the conversion layer A. Depending on the selection of range of irradiation of the output conversion layer 170, the QLpX-1 may be constructed, for example, with the following combinations of further conversion layers and/or selection of the light source 110, e.g. a LED.

According to an embodiment, the light emitting structure 100 comprises the QLpX-1 and the input wavelength of the light 120 emitted by the light source 110 is in a range between 400 nm and 480 nm, for example 450 nm. As the absorption of the conversion structure A is high in this wavelength range, the conversion structure 140 may comprise only one conversion layer, namely the output conversion layer 170, so that the conversion structure may be manufactured particularly easy.

According to an embodiment, the light emitting structure 100 comprises the QLpX-1 and the input wavelength 120 is 500 nm±70 nm. In this case, the QLpX-1 comprises the conversion layer H as the input conversion layer 250 that may emit light 255 with a wavelength of 980 nm. Further, the QLpX-1 may comprise an intermediate conversion layer 260 comprising polyethylene glycol (PEG) coated $NaYF_4$:Yb,Tm, that may convert the light 255 into light 265 with a wavelength of 375 nm/430 nm, which may be used to illuminate the output conversion layer 170. The input wavelength 120 in the range of 500 nm±70 nm enables using a relatively cost-efficient LED in the RGB visible color range.

According to an embodiment, the light emitting structure 100 comprises the QLpX-1 and the input wavelength of the light 120 emitted by the light source 110 is in a range between 550 nm and 700 nm, for example in the green (520 nm-560 nm), the yellow (560 nm-590 nm), the orange (590 nm to 635 nm) or the red (635 nm to 700 nm) regime. As the conversion structure A may absorb light of these wavelength ranges, the conversion structure 140 may comprise only one conversion layer, namely the output conversion layer 170, so that the conversion structure may be manufactured particularly easy and at the same time a relatively cost-efficient LED in the RGB visible color range may be used. Depending on the sensing volume of a PAS sensing device, the luminescence intensity of this configuration of the light emitting structure 100 may be sufficient for the quality of detection of $CO_2$.

According to an embodiment, the light emitting structure 100 comprises the QLpX-1. As may be seen in FIG. 4A, a local maximum of the absorbance of the conversion layer A may be around 770 nm. Thus, by irradiating the output conversion layer 170 with light of a wavelength centering at wavelength of 770 nm, a high PL intensity may be emitted by the output conversion layer 170, also shown in FIG. 4B. For illuminating the output conversion layer 170, the conversion structure 140 may comprise the conversion layer B or the conversion layer C as the input conversion layer 250. As described above, both types B and C may emit light of a wavelength of 770 nm upon absorption of light in the visible range, so that the light source 110 may comprise a visible range LED. Both variants of this embodiment are economically cheap and the conversion of is effective, so that a choice between type B and C may be made with respect to application, availability and cost, leaving a high flexibility in the design of the light emitting structure 100.

Figure 10:
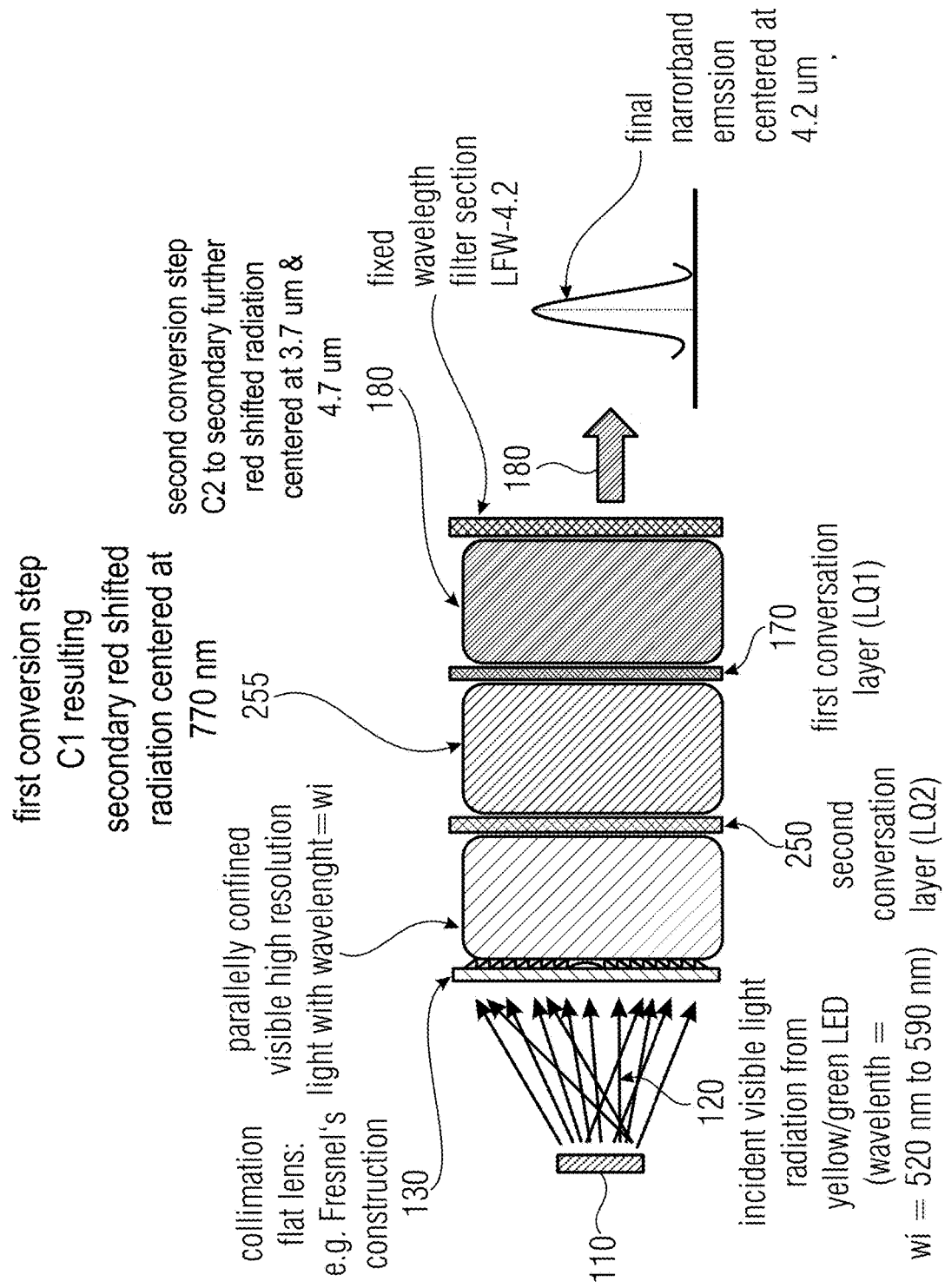
FIG. 10 shows a schematic representation of a conversion process according to an embodiment.

FIG. 10 illustrates a conversion process according to an embodiment of the light emitting structure based on QLpX-1. The light source 100 may comprise a visible light LED in the range of 500 nm to 590 nm, e.g. a green or yellow colored LED. Further, the conversion structure 140 may comprise the conversion layer B or C as the input conversion layer 250 which may be arranged on top of the collimation layer LC, e.g. the collimation lens 230 that is arranged on top of said LED's illuminating surface. The output conversion layer 170, e.g. the conversion layer A, may be arranged between the input conversion layer 250 and a fixed wavelength filter section layer LFW-4.2, e.g. the spectral filter 290 with a center wavelength of 4.2 µm. Therefore, upon irradiation of the input conversion layer 250 by means of confined primary radiation (e.g., with a wavelength in a range from 520 nm to 590 nm) though LC, secondary radiation, e.g. the light 255, centered at 770 nm may be emitted. This may be referred to as first conversion step ($C_1$). This converted radiation 255 may then irradiate the second conversion layer LQ1 180 in the process to further emit a spectrum having two peaks at 3.3 µm and 4.7 µm as shown in FIG. 4B. This conversion is denominated C2, a second conversion step. Finally, a fixed wavelength filter section LFW-4.2, e.g. the spectral filter 290, may block the part of the spectrum centered at 3.4 µm and may further confine the emission centering at 4.2 µm, which may lead to the final emission out of QLpX-1.

A second configuration of the QLpX 305 is referred to as QLpX-2 and is configured to emit light 180 of an output wavelength of 3.3 µm. For example, $CH_4$ is sensitive to light of this wavelength, so that QLpX-2 may be used for sensing $CH_4$. QLpX-2 may be configured equivalent to QLpX-1, except for the spectral filter 290, which may comprise a center wavelength of 3.3 µm. This modification may result into an emission of light 180 of an output wavelength confined around 3.3 µm, which may be required or usable to detect $CH_4$. This modification of QLpX-1 may be feasible due to a high PL intensity of radiation resulting in second conversion step C2 in QLpX-1, e.g. a conversion of the conversion layer A.

A third configuration of the QLpX 305 is referred to as QLpX-3 and is configured to emit light 180 of an output wavelength of 2.7 µm. For example, $H_2S$ is sensitive to light of this wavelength, so that QLpX-3 may be used for sensing of $H_2S$. Equivalent to QLpX-2, QLpX-3 may be configured equivalent to QLpX-1, except for the spectral filter 290, which may comprise a center wavelength of 2.7 µm.

A fourth configuration of the QLpX 305 is referred to as QLpX-4 which is configured to emit light 180 of an output wavelength of 2.3 µm. For example, $NH_3$ is sensitive to light of this wavelength, so that QLpX-4 may be used for sensing of $NH_3$. For example, the QLpX-4 may comprise two conversion layers with three conversion steps. The QLpX-4 comprises the conversion layer D as the output conversion layer 170. Referring to the absorption spectrum of the conversion layer D in FIG. 7, in order to achieve an emission of light with a wavelength of 2.3 µm, the output conversion layer may be required to be irradiated from with light of an energy of 0.6 eV and/or higher, e.g. till 0.7 eV or with light of a wavelength in a range between 3.5 µm and 3.8 µm. Thus, the QLpX-4 comprises an input conversion layer 250.

According to an embodiment, the light emitting structure 100 comprises the QLpX-4 which comprises the conversion layer E as intermediate conversion layer 260 and further comprises the conversion layer F as input conversion layer 250. Due to the absorption and emission spectra of the nanoparticles of type F, these QDs can be employed effectively for the construction of the QLpX-4, for example in combination with the light source 110 comprising a LED for emitting light with a wavelength in the visible range between 520 nm and 590 nm. In this configuration of the QLpX-4, the spectral filter 290 may be expandable, as the conversion may yield directly into a PL having peak at 2.3 μm at the final conversion step of the output conversion layer 170. This configuration of the light emitting structure 100 may have a +20% QY at the final conversion step, which may result from individual QYs of the individual conversion layers up to 40% to 60%. In other words, in this configuration of QLpX-4, the third conversion layer $LQ_3$, i.e. the input conversion layer, may convert visible incident light 120 into secondary emission 255 with a peak at 1200 nm in a first conversion step (C1); this secondary emission 255 may illuminate the second conversion layer $LQ_2$, e.g. the intermediate conversion layer 260, what may result in emission of turnery PL emission 265, e.g. with a peak at 1800 nm in a second step of conversion (C2). Finally radiation 265 resulted in C2 may be absorbed by a final conversion layer $LQ_1$, e.g. the output conversion layer 170, directly yielding into final PL emission 180 with peak at 2.3 μm (0.54 eV).

According to an embodiment, the light emitting structure 100 comprises the QLpX-4 which comprises the conversion layer A as intermediate conversion layer 260. As the conversion layer A may have a high PL intensity with a peak at a wavelength of 3.4 μm (energy of 0.36 eV), the conversion layer A may efficiently excite the output conversion layer of QLpX-4, as the conversion layer D has a peak of absorption at this energy as shown in FIG. 7. This matching may increase overall conversion efficiency multifold, e.g. compared to the configuration with the conversion layer E as intermediate conversion layer 260, as a QY of PbSe QDs of the conversion layer E may be 40%. According to this configuration, the QLpX-4 comprises the conversion layer B or C as input conversion layer 250, equivalent to the corresponding configuration for illumination of the conversion layer A as output conversion layer in the QLpX-1. Thus, the light source 110 may be a green visible light LED, e.g. in a range of 520 nm to 560 nm or a yellow visible light LED, e.g. in a range of 560 nm to 590 nm. The light 120 of the input wavelength may be converted by the input conversion layer into light 255 with a wavelength within a band around 770 nm. In this configuration, the QLpX-4 may comprise the spectral filter 290 with a center wavelength of 2.3 μm. For example, the spectral filter may filter or block intermittent PL radiation of the intermediate conversion layer 260 centering at 4.7 μm as shown in FIG. 8B. In other words, the QLpX-4 may be configured by using the input conversion layer and the output conversion layer of the QLpX-1 as an input conversion layer and an intermediate conversion layer of QLpX-4, respectively. Therefore, except for final conversion step (C3) taking place at the output conversion layer of QLpX-4, the other two conversion steps C1 and C2 may be equivalent as described with respect to QLpX-1. Therefore, resulting pixel of this configuration of the QLpX-4 may have a high PL intensity due to a high QY of the individual conversion layers.

Figure 11:
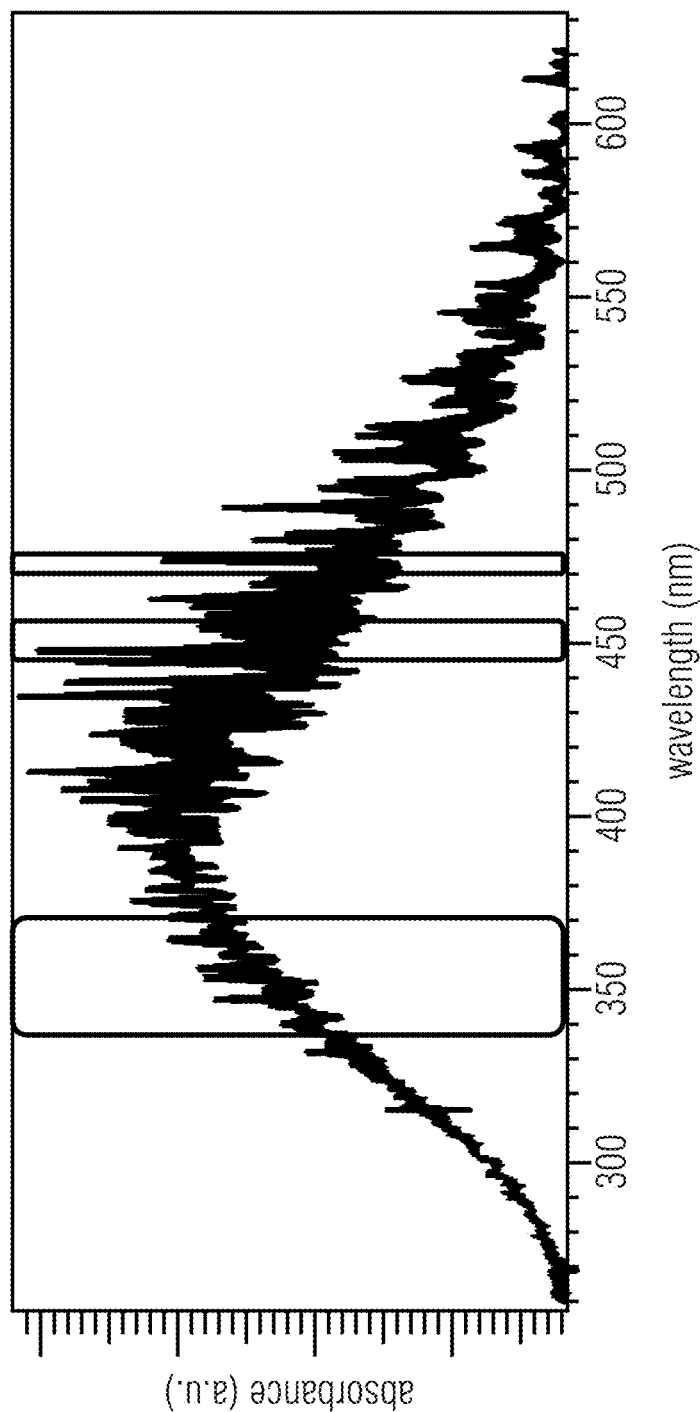
FIG. 11 shows an exemplary absorption spectrum of $NO_2$.

A fifth configuration of the QLpX 305 is referred to as QLpX-5 which is configured to emit light 180 of an output wavelength in a range of 340 nm to 375 nm and/or in a range of 445 nm to 455 nm and/or in a range of 470 nm to 477 nm. FIG. 11 shows an exemplary absorption spectrum of $NO_2$, having the before mentioned wavelength ranges highlighted. For example, QLpX-5 may be used for exciting or sensing of $NO_2$ by means of PAS principle. For example, the construction of the QLpX-5 may implement both optical up-conversion and down-conversion processes for achieving an efficient light emission in the before mentioned wavelength ranges. The QLpX-5 comprises two conversion layers namely, $LQ_1$ or the output conversion layer 170 and $LQ_2$ or the input conversion layer 250. The QLpX-5 comprises the conversion layer G as the output conversion layer 170 and further comprises the conversion layer H as the input conversion layer 250. As the conversion layer H may have a broad emission around 950 nm, it may efficiently increase the photon pumping in the output conversion layer 170.

According to an embodiment, the light emitting structure 100 comprises the QLpX-5 and the light source 110 comprises a visible light yellow or green color LED. For example, the light source 110 comprises a high lumen or a bright LED, so that the QLpX-5 may achieve a higher conversion efficiency. A high power of the input light 120 may increase the efficiency of the up-conversion process to UV light, as this process may involve electron pumping by means of two to three photons. In other words, QLpX-5 may have two conversion layers $LQ_1$, e.g. the output conversion layer, and $LQ_2$, e.g. the input conversion layer. The second layer $LQ_2$ may absorb visible light 120 emitted by an LED and may emit light 255 in the NIR range, e.g. light with a spectrum peaking at 950 nm±50 nm, following first optical down-conversion as a first conversion step $CS_1$. This secondary radiation 255 may be absorbed by the first conversion layer $LQ_1$, which may, as a result of optical up-conversion, further emit ternary PL radiation 180 in ranges 340 nm to 375 nm, 445 nm to 455 nm and 470 nm to 477 nm. These ranges of emission may excite $NO_2$ gas in a sensing volume, e.g. a small sensing volume, resulting in acoustic equivalent pressure, which may be detected according to the PAS working scheme.

According to an embodiment, the conversion layer G of the OLpX-5 comprises a composition of micro strands 1342, 1344 of fiber, for example cylindrical fiber strands which may have diameters in a range of 6 μm to 8 μm. These fiber strands 1342, 1344 may comprise a polymer mixture which may have two parts of resin for a part of acrylate. For preparing the fiber strands, the polymer mixture may be doped with the nanoparticles of type G with 6.5 wt % (weight %) concentration before fabricating said strands. Using this mixture firstly cylindrical strands Stcyl-6.5 may be prepared, e.g. a first type of strands 1342. Further, the concentration of doping of said mixture with said QDs may be raised to 22 wt % and similarly cylindrical strands Stcyl-22 may be prepared, e.g. a second type of strands 1344. Having the cylindrical fiber strands may enhance the photo pumping and an emission of luminescence, e.g. in a band around the output wavelength, e.g. in a chosen band of excitation of $NO_2$, e.g. in the band. For example, for the entire construction of the QLpX-5, the strands (Stcyl-6.5 & Stcyl-22), when placed alternately, e.g. in a fashion like depicted in FIG. 13, form layer $LQ_1$ of QLpX-5. FIG. 12 shows an exemplary emission spectrum of the conversion layer G in a configuration comprising the strands.

It is pointed out that the described preparation and configuration of strands is not limited to the conversion layer G but may equally or similarly be applied to other configurations of conversion layers, e.g. the described conversion layers A-I.

Figure 22:
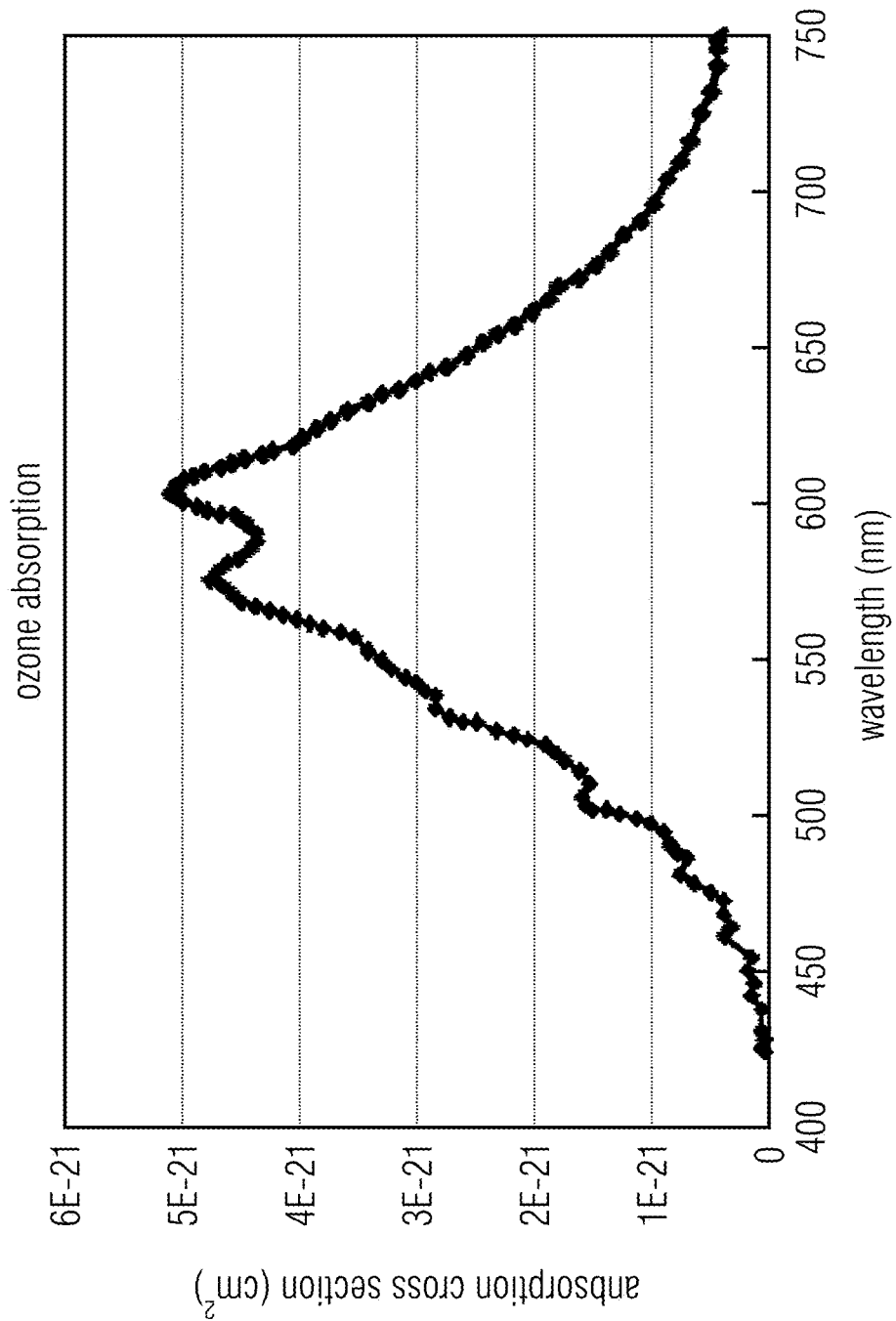
FIG. 22 shows an exemplary absorption spectrum of ozone.

FIG. 22 shows an exemplary photo absorption spectrum of ozone $O_3$, which appears as broad continuum encompassing the whole visible range of the spectrum with two peaks mainly around 575 nm and 603 nm.

A sixth configuration of the QLpX 305 is referred to as QLpX-6, configured for emitting light 180 of an output wavelength of 600 nm which is very close to an absorption peak of ozone around 603 nm, the spectrum shown almost same absorption sensitivity at 600 nm. QLpX-6 comprises the conversion layer I as the output conversion layer 170.

According to an embodiment, the light emitting structure comprises the QLpX-6, and the light source 110 may emit lumen green or yellow light. The light source 110 may be a high lumen light source. In other words, in this configuration, the output conversion layer 170 may be illuminated by a LED and through the collimation lens 230, so as to emit a secondary PL emission 180 with a wavelength in a band around 600 nm. The spectrum of the light 180 emitted by the output conversion 170 may be within a narrow band, e.g. a band with a FWHM 35 nm. As $O_3$ is sensitive to 600 nm emission, in this configuration, a further fixed wavelength bandpass filter section layer, e.g. the spectral filter 290, may be expendable.

According to further embodiments, the light emitting structure 100 comprises the QLpX-1, but the spectral filter 290 of the QLpX-1 comprises a center wavelength of 4.61 μm, or 4.02 μm, or 3.03 μm, or 3.56 μm, or 4.47 μm. Thus, the light emitting structure 100 may be configured for exciting CO, or $SO_2$, or ethane $C_2H_2$, or $CH_2O$ formaldehyde, or $N_2O$.

In other words, the light emitting structure 100 may combine a visible or high energy light source in a small form factor, for example a LED in a surface-mount technology (SMT) package, for example with dimensions of 0.65 mm×0.35 mm×0.2 mm together with, a microphone and a micro-processor/controller/ASIC to achieve PAS based gas detection/sensing in smallest possible size.

In other words, the QLpX 305 may be constructed by stacking the conversion layers between the collimation layer, e.g. the collimation lens 230, and the fixed wavelength optical filter, e.g. the spectral filter 290. The number of conversion layers may be decided based on a number of conversion steps involved in transforming an irradiated visible light 180 into a desired radiation 180 of particular wavelength.

Figure 14:
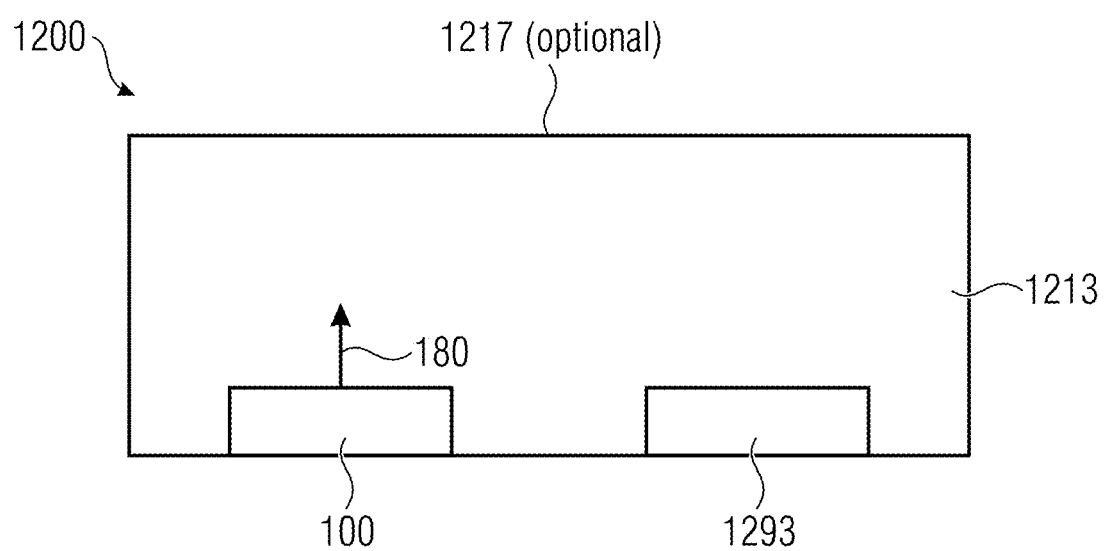
FIG. 14 shows a schematic representation of a PAS sensing device according to an embodiment.

FIG. 14 shows a schematic representation of a PAS sensing device 1200 according to an embodiment. The PAS sensing device 1200 for sensing a target gas comprises a cavity 1213 providing an interaction volume for an optical interaction between the target gas and light 180, wherein the cavity 1213 is accessible for an environmental gas comprising the target gas. The PAS sensing device 1200 comprises at least one light emitting structure 100 configured for emitting the light 180 into the cavity 1213, the light 180 having the output wavelength of the at least one light emitting structure 100. The output wavelength is adapted to an absorption wavelength of the target gas. The PAS sensing device 1200 further comprises a receiver 1293 configured for receiving an acoustic signal from within the cavity. That is, the light 180 may have the output wavelength of the light emitting structure 100 emitting the light 180. For example, the PAS sensing device 1200 may comprise a plurality of light emitting structures 100 with different output wavelengths which may be adapted to different target gases.

As shown in FIG. 14, the cavity 1213 may optionally comprise an opening 1217 for providing the environmental gas with access to the cavity 1213. However, the access may also be provided by other means, for example, an opening for providing the access may be integrated to other components of the PAS sensing device 1200, e.g. to the receiver 1293.

The PAS sensing device 1200 comprising the light emitting structure 100 may embody the features and advantages as described with respect to the light emitting structure 100 for a PAS sensing device. For example, the feature and advantages detailed in the context of the light emitting structure may be beneficially applied in combination with the PAS sensing device 1200.

Figure 15A:
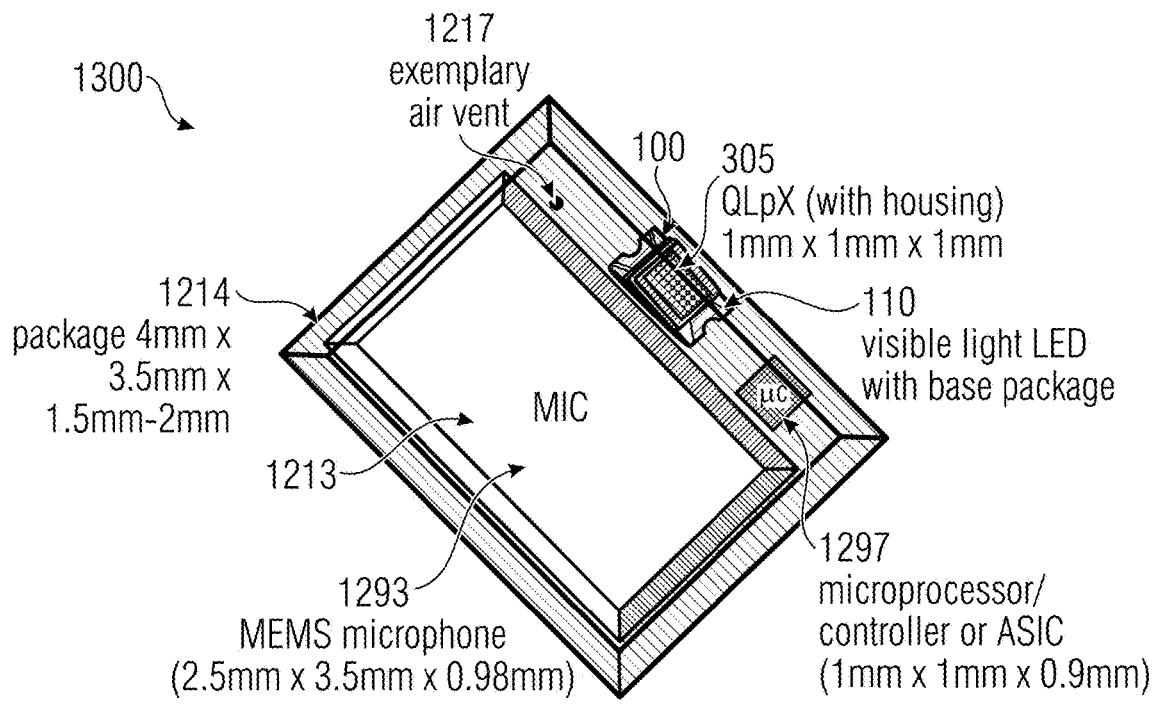
FIG. 15A shows a schematic representation of a PAS sensing device according to a further embodiment.

FIG. 15A illustrates a PAS sensing device 1300 according to an embodiment. The PAS sensing device 1300 may be an example of the PAS sensing device 1200, and may be configured for single-gas sensing. Thus, the PAS sensing device 1300 comprises one light emitting structure 100 comprising a QLpX 305 and a light source 110. The QLpX 305 may comprise a housing 395 and may have dimensions of 1 mm×1 mm×1 mm. The light source 110 may be a visible light LED, for example implemented in a base package. The receiver 1293 of the PAS sensing device 1300 comprises a MEMS microphone and may have dimensions of 2.5 mm×3.5 mm×0.98 mm. The PAS sensing device 1300 comprises a package 1214, for example with dimensions of 4 mm×3.5 mm×1.5 mm to 2 mm. For example, the package 1214 may provide the cavity 1213 of the PAS sensing device. The PAS sensing device 1300 further comprises a signal processor 1297, for example a microprocessor, a microcontroller or an ASIC, for example with dimensions of 1 mm×1 mm×0.9 mm. The signal processor 1297 may be configured for receiving a signal from the receiver 1293, e.g. a reference signal or a sensing signal. The signal processor 1297 may further be configured for providing the light source 110 with a modulation signal, for example with a modulation function. For example, the signal processor 1297 may be an implementation of the apparatus for obtaining information about a target gas as described in the context of the corresponding method with respect to FIG. 19.

In other words, FIG. 15A may show an exemplary system level view of a gas sensing device 1300 employing a QLpX for single gas detection. The concept may be extended for detecting more gases, for example in the same device boundary, e.g. with the same dimensions of the gas sensing device 1300, by trading off dimensions of the components of the gas sensing device 1300. One example of the possible system level designs for such setup is shown in FIG. 15B.

It is pointed out that the dimensions shown in exemplary designs of PAS sensing devices and components thereof are based on standard smallest packages available from off the shelf components, thus facilitating a cost-efficient manufacturing process. In other words, the PAS sensing devices may have a small overall size/dimensions making use of standard dimensions of off the shelf components. However, the PAS sensing devices and the components thereof are not restricted to these dimensions or claim to be effective only for these dimensions. Even further miniaturization or magnification with alternate designs, technologies are possible. Similarly, however, the PAS sensing devices may be equally effective for other possible placements of components and other possible floorplans as shown in FIGS. 15A-B, 16, 18.

Figure 15B:
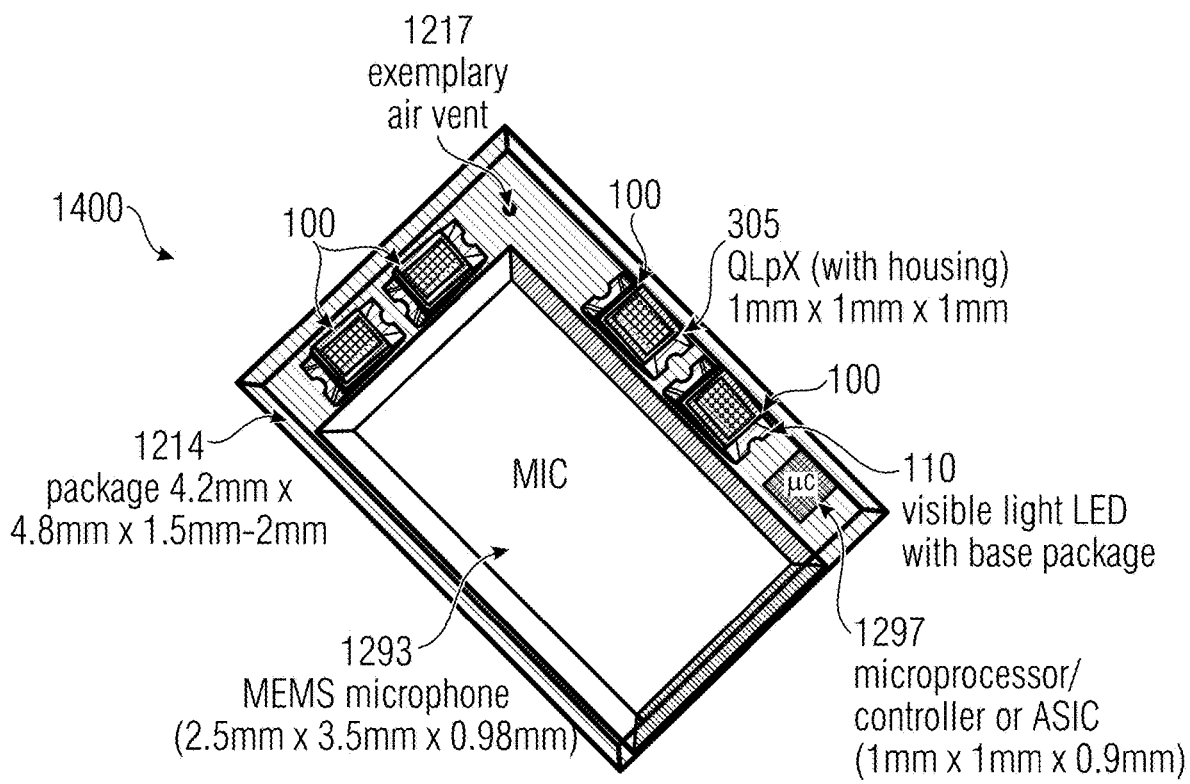
FIG. 15B shows a schematic representation of a PAS sensing device according to a further embodiment.

FIG. 15B illustrates a PAS sensing device 1400 according to an embodiment. The PAS sensing device 1400 may be an example of the PAS sensing device 1200, and may be configured for multi-gas sensing. The PAS sensing device 1400 may comprise the components of the PAS sensing device 1300, so that the respective description may apply equally. Compared to the PAS sensing device 1300, the PAS sensing device 1400 comprises multiple, for example four, light emitting structures 100. Accordingly, the signal processor 1297 may be configured to provide each of the light emitting structures with a modulation signal. For example, the package 1214 of the PAS sensing device 1400 may have dimensions of 4.2 mm×4.8 mm×1.5 mm–2 mm.

In other words, FIG. 15B shows an exemplary system design for detection of four gases using four QLpX 305 with a corresponding configuration. For detection of a number of n gases, same number n of QLpX 305 or light emitting structures 100 may be constructed and may be placed as shown in exemplary system design in FIG. 15B.

Figure 16:
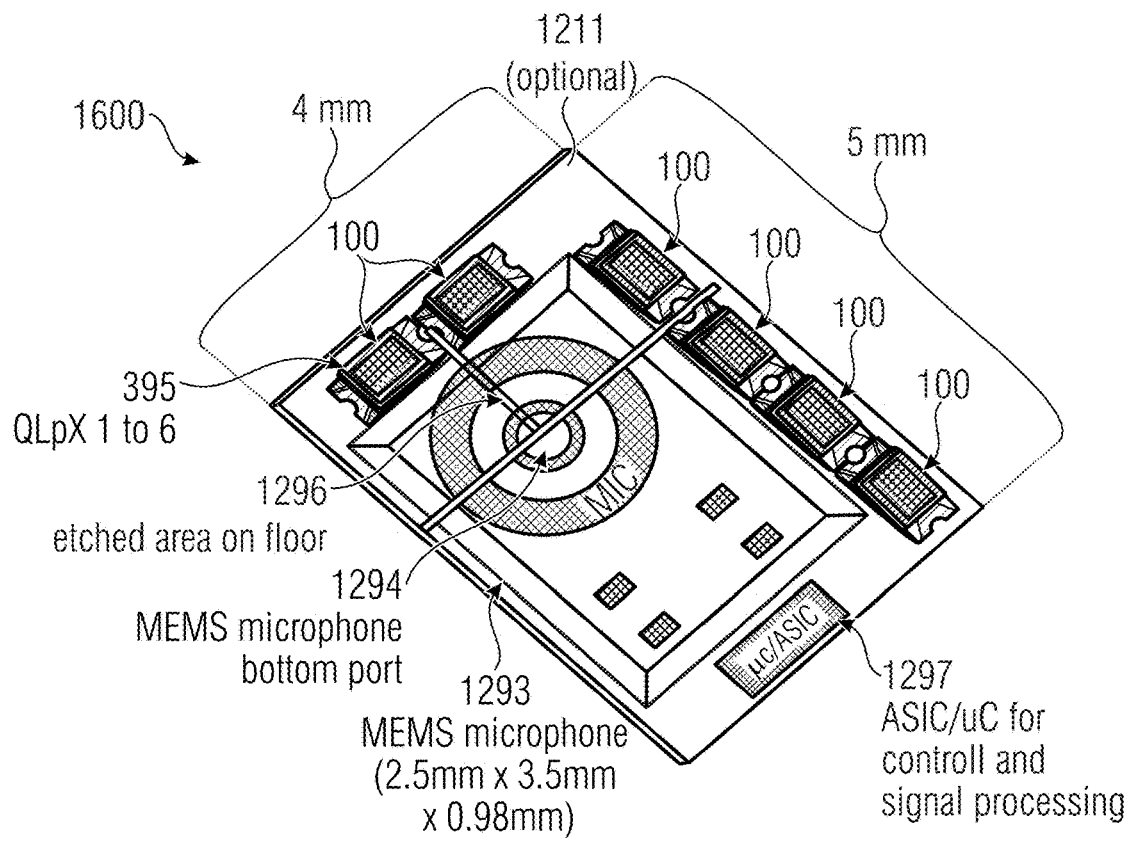
FIG. 16 shows a schematic representation of a floorplan of a PAS sensing device according to a further embodiment.

FIG. 16 shows a schematic representation floorplan (without showing an optional lid) of a PAS sensing device 1600 according to an embodiment. The floorplan shows an exemplary placement of all components of the PAS sensing device 1600 and exemplary projected dimensions. The PAS sensing device 1600 may be an example of the PAS sensing device 1200, and may be configured for multi-gas sensing. The PAS sensing device 1600 may comprise the components of the PAS sensing devices 1300, 1400, so that the respective description may apply equally. The PAS sensing device 1600 may have a particularly space saving arrangement of its components and may have a particularly small sensing volume.

The receiver 1293 may comprise a MEMS microphone with a bottom port 1294. The bottom port 1294 is arranged at a main surface are of the receiver 1293 facing away from the cavity 1213. The bottom port 1294 is arranged adjacent to one or more channels 1296 connecting the bottom port 1294 to the cavity 1213. For example, the one or more channels 1296 may be arranged at a main surface region of a base plate of the PAS sensing device 1600, adjacent to which the main surface region of the receiver 1293 is arranged. For example, the one or more channels may be etched into the main surface region of the base plate. In other words, the bottom port 1294 may be placed on etched lines which may open at a sensing volume/package, e.g. the cavity 1213. The arrangement of the bottom port 1264 and the channels 1296 may reduce the direct opening of a port of the MEMS microphone to the ambient environment, thus reducing problems caused by blockages that may be caused by dust particles etc. Also, this arrangement may improve the stability of the system as it may reduce a direct ambient acoustic noise exposed to the MEMS microphone. The PAS sensing device 1600 may comprise six light emitting structures 100 with six QLpXs 305 for detection of six gases. The signal processor 1297, e.g. an ASIC/micro controller, may drive the receiver 1293, e.g. a MIC, and the light emitting structures 100 for detection of the corresponding gasses using the PAS principle. Further, the signal processor 1297 may also host a mechanism for user interactions, pulse shaping and signal processing methods, for example as explained with respect to FIG. 19. The signal processor 1297 may be configured for sensing a concentration of gases and communicating it to a user as a response to a user interaction.

Figure 17:
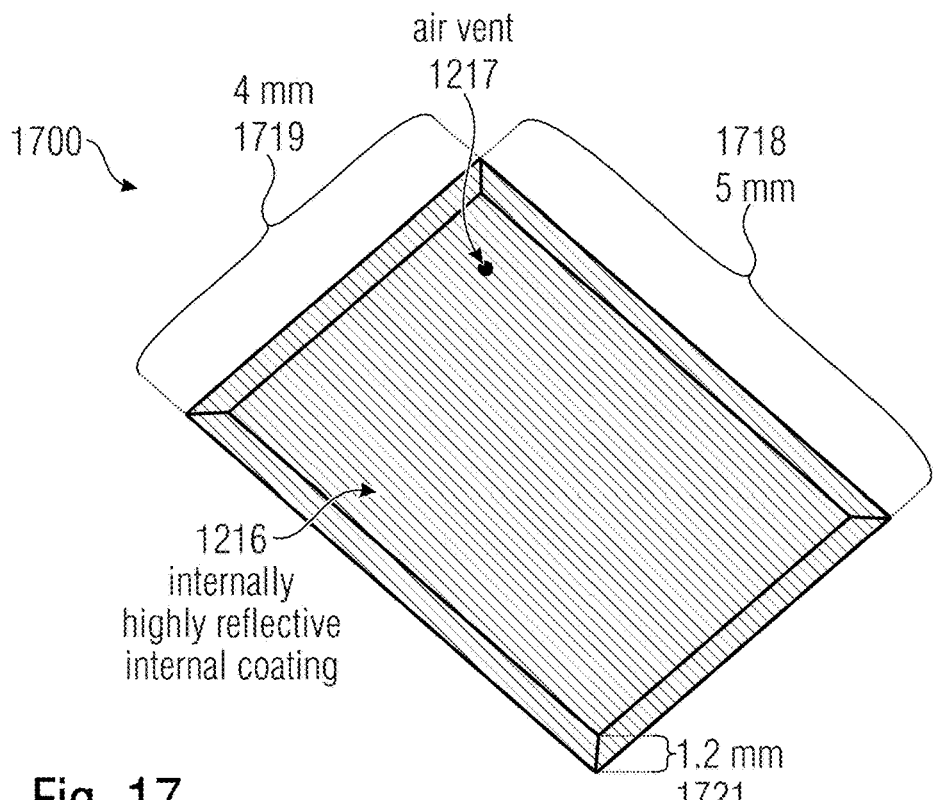
FIG. 17 shows a schematic representation of a lid for a PAS sensing device according to an embodiment.

FIG. 17 shows a schematic representation of a lid 1700 for a PAS sensing device according to an embodiment. For example, the lid 1700 may be configured, to be matched with a base plate of a PAS sensing device, so that the lid 1700 and the base plate together provide for the cavity 1213 of the PAS sensing device. For example, the lid may have dimensions of length 1718×width 1719×height 1721=5 mm×4 mm×1.2 mm. An inner surface 1216 facing towards the cavity 1213 when matching the lid 1700 to a PAS sensing device, e.g. walls of the lid 1700, may be coated with a material that is adapted to reflect light of the one or more output wavelength of the one or more light emitting structures of a PAS sensing device, so as to increase total internal reflections. The lid 1700 may comprise an opening 1217 for providing the cavity 1213 with access to the ambient environment. In other words, a placement of this lid may seal a floor of a PAS sensing device and the only interface to the ambient environment, e.g. air, may be through a vent as shown 1700.

Figure 18:
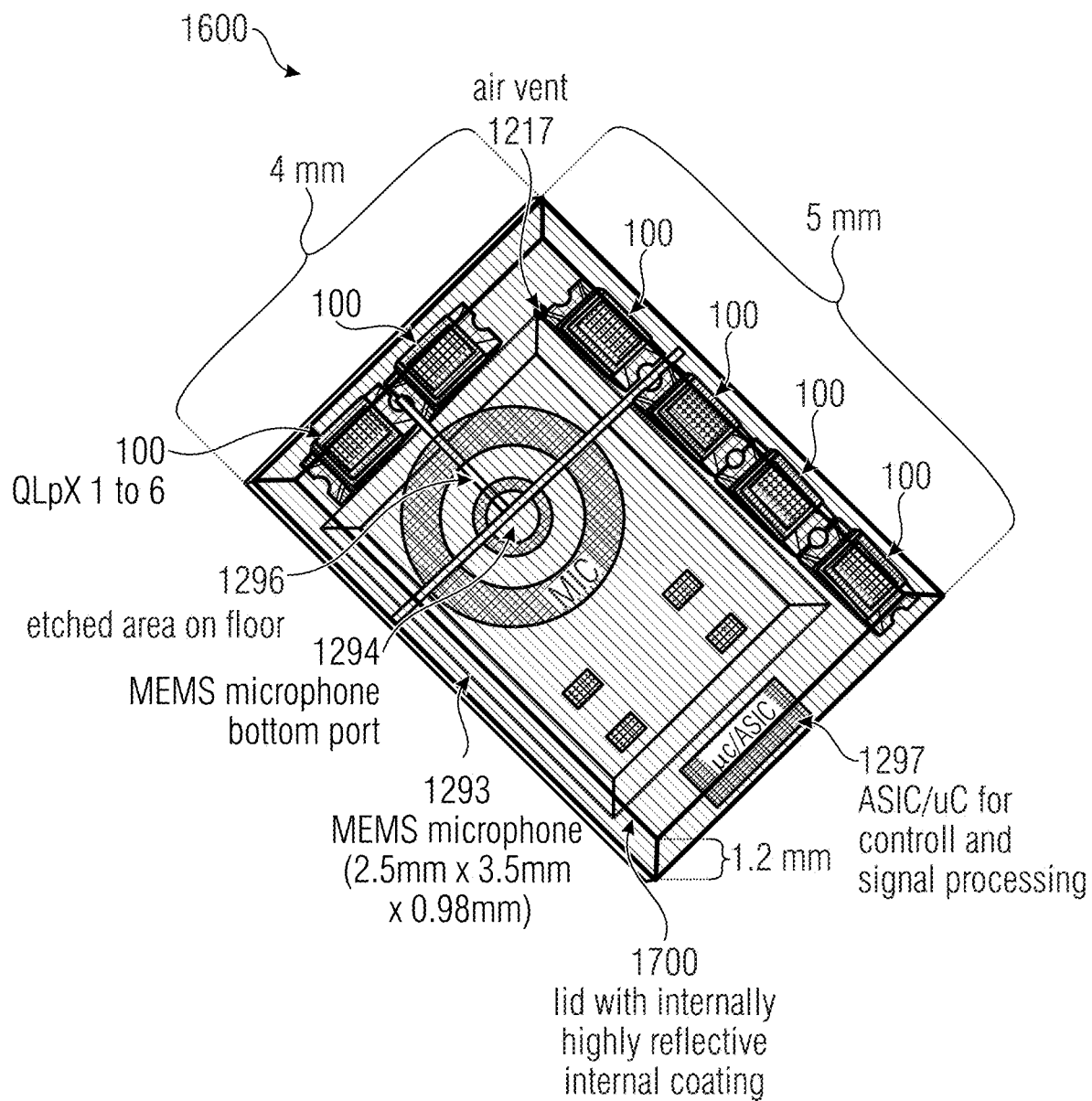
FIG. 18 shows a schematic representation of a PAS sensing device with a lid according to an embodiment.

FIG. 18 illustrates an arrangement of the PAS sensing device 1600 comprising the lid 1700 according to an embodiment. The lid 1700 and the base plate 1211 together provide the cavity 1213. It is pointed out, that the lid 1700 may equally or similarly be combined with other embodiments of the PAS sensing device. The dimensions of the PAS sensing device with the lid may, for example correspond to the above described exemplary dimensions of the lid 1700. The small sensing volume, e.g. the cavity 1213, may increase an overall stability and quality of a detection of a gas using the PAS principle. The small dimensions of the PAS sensing device 1600 enables using the device under very space constrained applications like mobile phones, smart watches etc.

FIG. 19 shows a flow chart of a method 2000 for operating a PAS sensing device 1200, 1300, 1400, 1600 according to an embodiment. The method 2000 comprises receiving 2010 an acoustic reference signal from a cavity 1213 accessible for an environmental gas comprising a target gas. Further, the method 2000 comprises analyzing 2020 the acoustic reference signal to obtain noise information and adjusting 2030 a filter function based on the noise information. The method 2000 comprises a further step of sensing 2040 the target gas. The sensing 2040 comprises providing 2041 the cavity 1213 with light 180, so that the light 180 is modulated based on the filter function. The sensing 2040 further comprises receiving 2042 an acoustic sensing signal from the cavity. Steps 2041 and 2042 are performed simultaneously, that is, the acoustic sensing signal is received from the cavity 1213 while the cavity 1213 is provided with the light 180. The method 2000 further comprises analyzing 2050 the acoustic sensing signal by using the filter function so as to obtain information about the target gas in the cavity 1213.

For example, the information about the target gas may be a concentration of the target gas within the cavity 1213, which may be inferred from the acoustic sensing signal. The acoustic sensing signal may at least partially be induced by the target gas as a result of an irradiation of the target gas by the light 180. For example, the light 180 may be provided as a series of light pulses, the light pulses reoccurring at an excitation frequency. The light pulses may be described by a pulse shape, representing for example a temporal evolution of the intensity of the emitted light 180 within a duration of the light pulse. For example, the pulse shape, frequency and intensity of the light 180 may follow the filter function, which may be used to modulate an intensity of a light source emitting the light 180, e.g. the light emitting structure 100, accordingly. For example, under ideal conditions, a form of the acoustic sensing signal induced by an excitation of the target gas with the light pulse may follow the filter function. However, the acoustic sensing signal may comprise an acoustic noise signal which may superpose an acoustic signal induced by the target gas, so that a measurement of the information about the target gas may be inaccurate.

Receiving 2010 the acoustic reference signal may be performed during a time period, in which the target gas is not irradiated with the light 180. Thus, the acoustic reference signal may provide an estimation of an acoustic noise in the cavity 1213. For example, analyzing 2020 may comprise a determination of parameters of the acoustic reference signal, representing parameters about the acoustic noise. For example, the analyzing 2020 may comprise obtaining a frequency, an intensity, and/or a shape of the acoustic reference signal or the acoustic noise.

The adjusting 2030 of the filter function may rely on the determined parameters for selecting and/or adjusting the filter function so as to improve a capability to distinguish an acoustic signal induced by the target gas from an acoustic noise signal. For example, the power or the amplitude of the irradiation of the target gas may correlate to an intensity of the acoustic noise signal, e.g. an amplitude of the acoustic reference signal. A frequency and a pulse shape of the filter function may be chosen to be different from a frequency and a pulse shape of the acoustic reference signal.

For example, adjusting 2030 the filter function may comprise selecting a pulse shape from a pulse shaping filter bank. The pulse shaping filter bank may comprise a set of pulse shaping filters including for example triangular, sinc, Gaussian, raised, and cosine pulse shapes and further comprising a set of wavelets exhibiting shapes including but not limited to Haar, Daubechies, Symlets, Mexican hat, Morlet, Complex Gaussian, Shannon. The filters in the set of filter bank may be normalized and may have a number of coefficients ascertaining the Nyquist criteria based on PAS excitation symbol ($S_x$), duration D and frequency of occurrence of $S_x$ within one sensing period, where D may be a time duration of an excitation pulse. The coefficients of all filter banks as well as bounds on excitation frequency posed by the QLpX 305 or the spectral filter 290 may be carefully adapted, so that an over- or under sampling may be avoided.

For example, the filter function may be dynamically adapted. For example, adjusting 2030 the filter function may be independent of other steps. For example, the adjusting 2030 may be performed in response to a change of the acoustic reference signal. For example, steps 2010, 2020 and 2030 may be performed at a different reoccurrence rate as steps 2040 and 2050.

Due to the modulation of the intensity of the light 180 according to the filter function, an acoustic signal induced by the target gas may also follow the filter function. Thus, the analyzing 2050 of the acoustic sensing signal may exploit knowledge about an expected form of the acoustic signal induced by the target gas by using the filter function. For example the analyzing 2050 may comprise a deconvolution of the received acoustic sensing signal with the filter function. As a consequence of the analyzing 2050, the method 2000 may be able to extract the acoustic signal induced by the target gas from the acoustic sensing signal or to increase a signal to noise ratio of the acoustic sensing signal. Thus, the analyzing 2050 may yield a very accurate measurement of the information about the target gas.

In other words, the method 2000 may increase a signal power of photo acoustic signal bearing a concentration of the target gas, in presence of acoustically noisy ambient conditions. For this purpose, the method 2000 may utilize a pulse shaping technique to modulate the intensity, frequency and shape of an envelope of luminescence emitted by an individual LED in a corresponding QLpX. In contrast, simple band pass filters may be ineffective as acoustic noise may have the same or similar frequency as that of the frequency of excitation for photonic emission. Thus, the method 2000 may reduce an impact of acoustic noise, which may result in constructive or destructive interference with a PAS signal, lowering a signal to noise ratio of the system.

In other words, according to examples, the microprocessor/controller or ASIC unit (Controller) will first activate one of the QLpX pertaining to the target gas to be sensed, together with MIC. Activation of QLpX, includes lighting up of the visible light LED with shaped pulse. Pulse shaping (for example, triangular, sinusoidal etc.) techniques/methods are employed in order to modulate the light intensity of said LED together with its operational frequency for improved SNR of gas detection in case of acoustic noise. At the same time, MIC signal is received and analyzed for detecting gas concentration as a function of acoustic feature. Such feature depends directly on pulse shaping and operational frequency used in activation of QLpX. Here, due to said pulse shaping, noise can discriminate between ambient acoustic noise and PAS signal to be measured/analyzed. A controller, further dynamically adapts the pulse shaping scheme as well as frequency of modulation based on the ambient noise conditions. This is done by first sensing the ambient acoustic noise using MIC module only. By means of ambient noise energy, frequency of modulation and pulse shaping scheme is adjusted then leading to LED lit profile per gas sensing run. Similarly for next run controller senses the ambient acoustic conditions and decided the LED lit profile.

Figure 20:
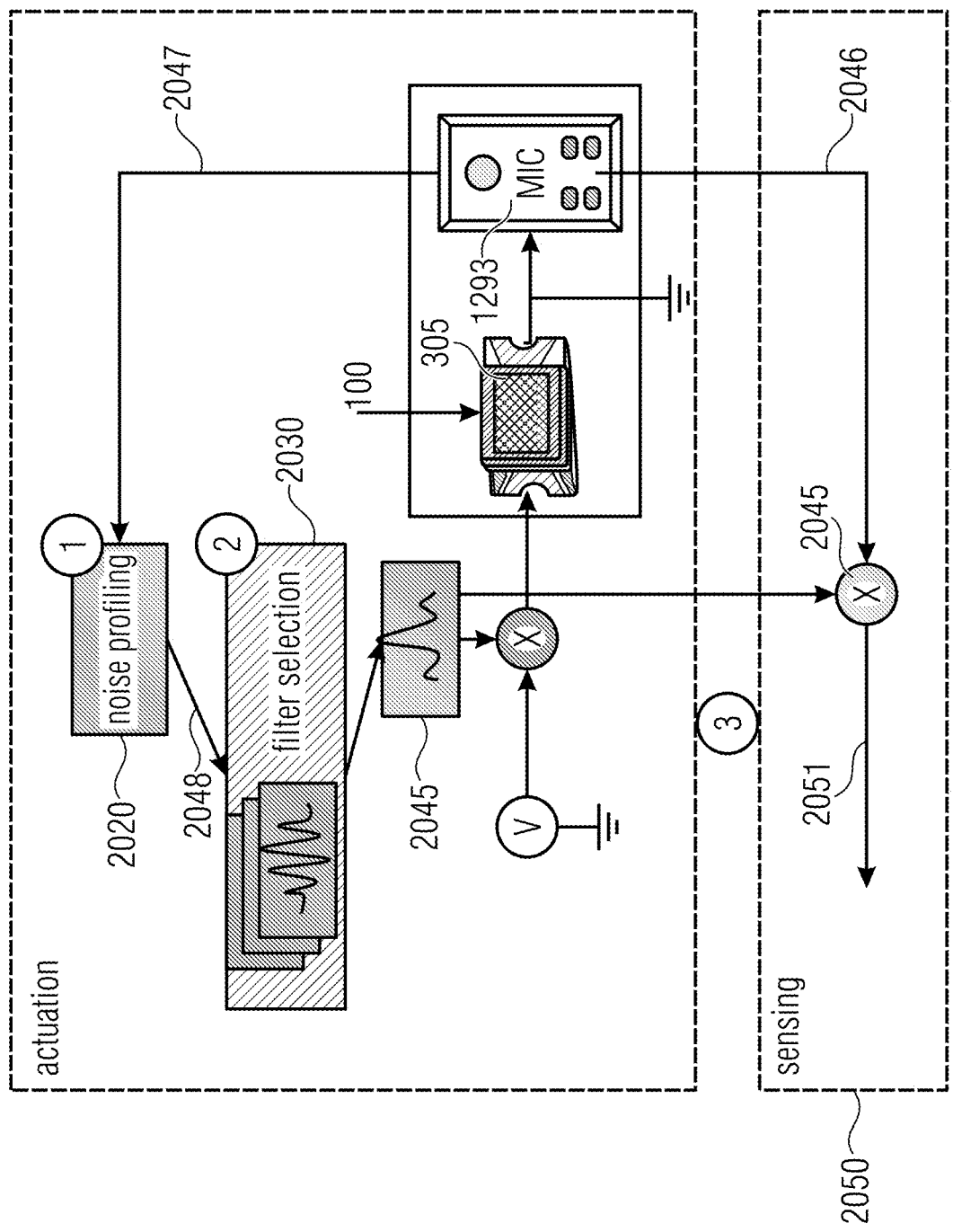
FIG. 20 schematically illustrates an interplay of a method for operating a PAS sensing device and a PAS sensing device.

FIG. 20 schematically illustrates an interplay of the method 2000 in combination with a PAS sensing device 1200 according to an embodiment. A modulation of the light source 110, or an actuation of the QLpX 305, by means of pulse shaping filter 2045 may be carried out in parallel with the sensing 2050, where same filter coefficients 2045 may be convolved with sensed MIC signal 2046 carrying both PAS signal and ambient noise. The ambient noise profiling is carried out in order to understand the current ambient acoustic conditions. This includes receiving the acoustic signal, e.g. the acoustic reference signal, by only activation of MIC/MEMS microphone 1293. For example, the receiver 1293 may provide a reference signal 2047 based on the acoustic signal. In this step, noise profile stating noise intensity, energy of noise pertaining to sensing spectrum, its shape etc. are monitored. Based on the estimates 2048 of noise profile from previous step, a best matching filter 2045 improving overall SNR is selected. This also involves the best possible frequency of activation based on lowest possible noise energy. The QLpX 305 activation and sensing by means of recovery of PAS signal from acoustic noise through MIC 1293 are carried out synchronously. Therefore, frequency 2045 of activation based on lowest noise energy as selected in previous step is used to activate QLpX 305 by means of voltage source V. In addition to that a said selected normalized shape filter (SPf) is convolved with voltage source (V) in order to get shaped activation pulse. At the same time same shaped filter (SPf) is convolved with microphone signal to extract PAS signal from acoustic noise.

Thus, the method 2000 and the PAS sensing device 1200 may be combined for efficient and accurate gas detection even in acoustically noisy environment.

Figure 21:
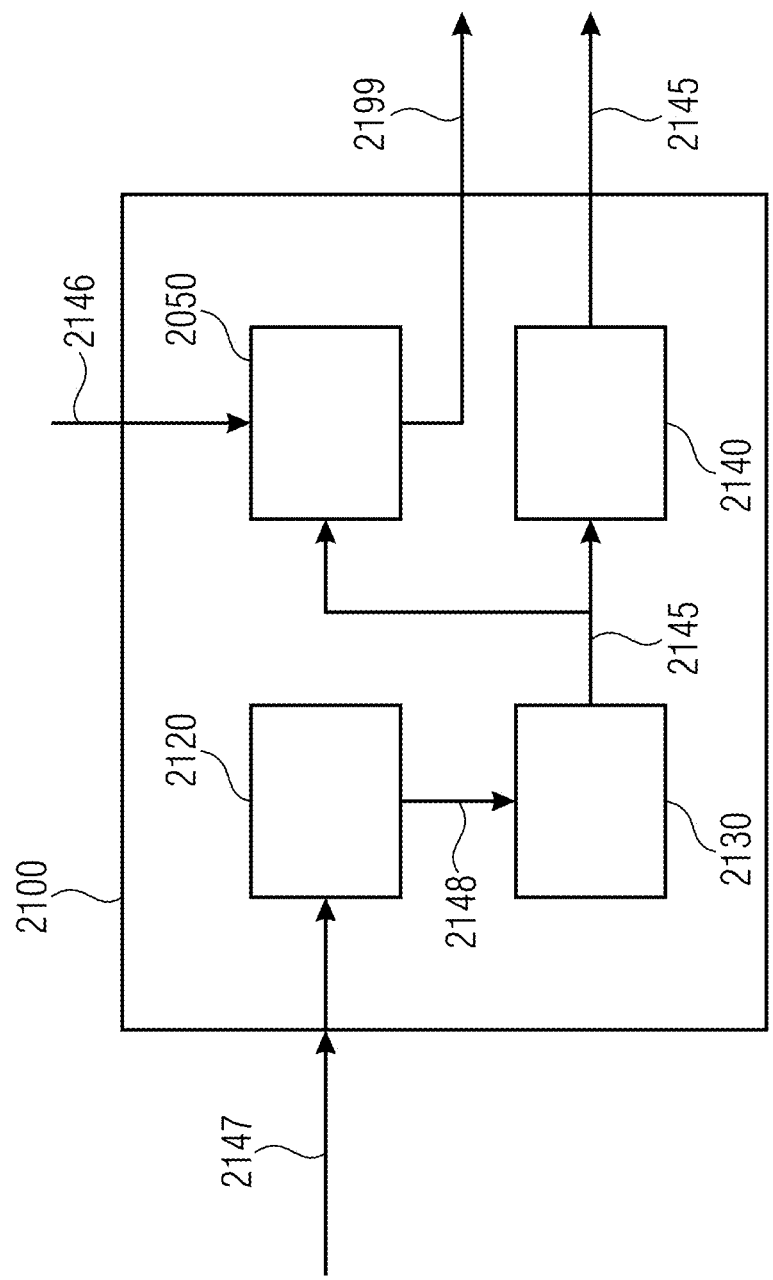
FIG. 21 shows a schematic representation of an apparatus for obtaining information about a target gas according to an embodiment.

FIG. 21 shows a schematic representation of an apparatus 2100 for obtaining information 2199 about a target gas according to an embodiment. The apparatus 2100 comprises means for receiving a reference signal 2147, e.g. the reference signal 2047. The reference signal 2147 represents an acoustic reference signal from a cavity 1213 accessible for an environmental gas comprising a target gas. Further, the apparatus 2100 comprises means 2120 for analyzing the reference signal 2147 to obtain noise information 2148. The apparatus 2100 comprises means 2130 for adjusting a filter function 2145 based on the noise information 2148 and further comprises means 2140 for providing the filter function 2145. For example, the means for providing the filter function may comprise means for providing a modulation signal for modulating or for driving a light source, e.g. the light source 110. The apparatus 2100 comprises means for receiving a sensing signal 2146 representing an acoustic sensing signal from the cavity. The means for receiving the sensing signal may comprise the means for receiving the reference signal or vice versa. The apparatus 2100 further comprises means 2050 for analyzing the sensing signal by using the filter function so as to obtain the information 2199 about the target gas in the cavity.

According to an embodiment, the PAS sensing device is connected to the apparatus 2100 or comprises the apparatus 2100.

Thus, according to an embodiment, the PAS sensing device 1200 comprises means for receiving 2010 an acoustic reference signal from within the cavity 1213, e.g. the receiver 1293. Further, the PAS sensing device 1200 may comprise means for analyzing 2020 the acoustic reference signal to obtain noise information, and for adjusting 2030 a filter function based on the noise information. The PAS sensing device 1200 may comprise means for sensing 2040 the target gas. The means for sensing 2040 may comprise means for providing 2041 the cavity 1213 with the light 180 of the output wavelength, so that the light 180 is modulated based on the filter function, e.g. by modulating the light source 110 of the light emitting structure 100 of the PAS sensing device 1200. The sensing 2040 may further comprise means for, simultaneously to providing 2041 the cavity 1213 with the light 180, receiving 2042 an acoustic sensing signal from the cavity 1213, e.g. by means of the receiver 1293. The PAS sensing device 1200 may further comprise means for analyzing 2050 the acoustic sensing signal by using the filter function so as to obtain information about the target gas in the cavity 1213. For example, the signal processor 1297 may provide the means for performing the functionalities 2020, 2030 and 2050.

For example, a PAS sensing device 1200, 1300, 1400, 1600 comprising the apparatus 2100 or making use of the method 2000 may provide an accurate sensing of the target gas while relying on a low power or low quality of the light emitting structure 100, or on a simple implementation of the receiver 1293, or on a simple implementation of the cavity 1213. Thus, the PAS sensing device may be space- and cost-efficient.

According to an embodiment, the PAS sensing device 1200, 1300, 1400, 1600 comprises the apparatus 2100 and the light source 110 of the PAS sensing device comprises a LED. As a LED may be modulated very fast and precise, this combination may yield a very accurate sensing of the target gas, for example despite a high level of acoustic noise in the cavity 1213. In other words, the PAS sensing device may provide a high performance of an overall gas sensing even in acoustically noisy conditions due to adaptive pulse shaping and modulation of LED power. Further, the PAS sensing device may be easily controlled by means of microprocessor/controller/software with minimalistic control loop and without power controlling excess circuitry.

A further embodiment provides a computer program for implementing the method for operating the PAS sensing device when being executed on a computer or signal processor.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described embodiments are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the embodiments herein.

What is claimed is:

1. A method for operating a photo-acoustic spectroscopy sensing device, the method comprising:
   receiving an acoustic reference signal from a cavity accessible for an environmental gas comprising a target gas;
   analyzing the acoustic reference signal to obtain noise information;
   adjusting a filter function based on the noise information;
   sensing the target gas, wherein the sensing comprises providing the cavity with light, so that the light is modulated based on the filter function, and simultaneously receiving an acoustic sensing signal from the cavity; and
   analyzing the acoustic sensing signal by using the filter function so as to obtain information about the target gas in the cavity, wherein providing the cavity with the light comprises operating a light emitting structure comprising:
   a light source, configured for emitting light of an input wavelength, and
   a conversion structure, configured for absorbing light of the input wavelength and emitting light of an output wavelength different than the input wavelength, wherein light emitted by the light source is modulated based on the filter function, wherein the conversion structure comprises an output conversion layer, wherein the output conversion layer comprises a plurality of nanoparticles, and wherein the nanoparticles of the output conversion layer are configured for emitting light of the output wavelength.

2. The method according to claim 1, wherein the conversion structure comprises at least two conversion layers forming a series of conversion layers including an input conversion layer and an output conversion layer.

3. The method according to claim 2, further comprising:
   performing a first conversion step comprising absorbing the light of the input wavelength and emitting light of an intermediate wavelength using the input conversion layer.

4. The method of claim 3, further comprising:
   performing a second conversion step comprising absorbing light of the intermediate wavelength and emitting the light of the output wavelength using the output conversion layer.

5. An apparatus for obtaining information about a target gas, comprising:
   means for receiving a reference signal, the reference signal representing an acoustic reference signal from a cavity accessible for an environmental gas comprising the target gas;
   means for analyzing the reference signal to obtain noise information;
   means for adjusting a filter function based on the noise information;
   means for providing the filter function;
   means for providing the cavity with light to generate an acoustic sensing signal;
   means for receiving the acoustic sensing signal from the cavity; and
   means for analyzing the acoustic sensing signal by using the filter function so as to obtain the information about the target gas in the cavity, wherein providing the cavity with the light comprises operating a light emitting structure comprising:
   a light source, configured for emitting light of an input wavelength, and
   a conversion structure, configured for absorbing light of the input wavelength and emitting light of an output wavelength different than the input wavelength, wherein light emitted by the light source is modulated based on the filter function, wherein the conversion structure comprises an output conversion layer, wherein the output conversion layer comprises a plurality of nanoparticles, and wherein the nanoparticles of the output conversion layer are configured for emitting light of the output wavelength.

6. The light emitting structure according to claim 5, wherein the nanoparticles of the output conversion layer are configured for absorbing light of the input wavelength.

7. The light emitting structure according to claim 5,
   wherein the conversion structure comprises at least two conversion layers forming a series of conversion layers including an input conversion layer and the output conversion layer,
   wherein the at least two conversion layers comprise respective pluralities of nanoparticles of respective types,
   wherein the input conversion layer comprises a second plurality of nanoparticles, wherein the nanoparticles of the input conversion layer are configured for absorbing light of the input wavelength, wherein an emission wavelength of the nanoparticles of a conversion layer of the series of conversion layers is adapted to an absorption wavelength of the nanoparticles of a subsequent conversion layer of the series of conversion layers, and wherein the series of conversion layers starts with the input conversion layer and ends with the output conversion layer.

8. The light emitting structure according to claim 7, wherein the input conversion layer is arranged between the light source and the output conversion layer, and wherein the series of conversion layers is arranged along a direction from the input conversion layer to the output conversion layer.

9. The light emitting structure according to claim 7, wherein at least one of the at least two conversion layers comprises a plurality of strands of a polymer material, wherein the strands comprise the nanoparticles of the at least one of the conversion layers, wherein the plurality of strands comprises at least two types of strands having different concentrations of the nanoparticles of the at least one of the conversion layers, and wherein strands of different types are arranged alternately within the at least one of the conversion layers.

10. The light emitting structure according to claim 7, wherein the nanoparticles of at least one of the at least two conversion layers comprises a core and one or more shells, wherein the core comprises a luminescent material, and wherein each of the one or more shells is arranged to enclose the core or the core and one or more other shells of the one or more shells.

11. The light emitting structure according to claim 5, further comprising a collimation lens arranged between the light source and the conversion structure, wherein the collimation lens is configured for collimating light emitted by the light source for obtaining a collimated light, and wherein the collimation lens is configured for illuminating the conversion structure with the collimated light.

12. The light emitting structure according to claim 5, further comprising a spectral filter arranged adjacent to the output conversion layer of the conversion structure, wherein the spectral filter is configured for selectively transmitting light of the output wavelength.

13. The light emitting structure according to claim 5, wherein the light source is a LED and wherein the input wavelength is in a range between 400 nm and 800 nm or in a range between 50 nm and 70 nm or in a range between 500 nm and 600 nm.

14. The light emitting structure according to claim 5, wherein the output wavelength is within a range of ±10% or ±5% of one of 4.2 µm, 3.3 µm, 2.7 µm, 2.3 µm, 4.61 µm, 4.02 µm, 3.03 µm, 3.56 µm, 4.47 µm.

15. The light emitting structure according to claim 5, wherein the nanoparticles of a specific type comprise a luminescent material, wherein the luminescent material and a size of the nanoparticles of the specific type are adapted so that the nanoparticles of the specific type are configured for absorbing light of a specific absorption wavelength and/or for emitting light of a specific emission wavelength.

* * * * *